(12) United States Patent
Enick et al.

(10) Patent No.: US 12,286,589 B2
(45) Date of Patent: Apr. 29, 2025

(54) METHOD OF OIL RECOVERY USING COMPOSITIONS OF CARBON DIOXIDE AND COMPOUNDS TO INCREASE CARBON DIOXIDE WETTABILITY OF FORMATIONS

(71) Applicants: University of Pittsburgh—Of the Commonwealth System of Higher Education, Pittsburgh, PA (US); THE UNITED STATES GOVERNMENT AS REPRESENTED BY THE DEPARTMENT OF ENERGY, Washington, DC (US)

(72) Inventors: Robert M. Enick, Bethel Park, PA (US); Deepak Tapriyal, Bethel Park, PA (US); Angela Goodman Hanson, Pittsburgh, PA (US); Dustin Crandall, Morgantown, WV (US)

(73) Assignees: University of Pittsburgh—Of the Commonwealth System of Higher Education, Pittsburgh, PA (US); The United States Government as Represented by the Department of Energy, Washington, DC (US)

( * ) Notice: Subject to any disclaimer, the term of this patent is extended or adjusted under 35 U.S.C. 154(b) by 424 days.

(21) Appl. No.: 17/625,391

(22) PCT Filed: Jul. 9, 2020

(86) PCT No.: PCT/US2020/041320
§ 371 (c)(1),
(2) Date: Jan. 7, 2022

(87) PCT Pub. No.: WO2021/007388
PCT Pub. Date: Jan. 14, 2021

(65) Prior Publication Data
US 2022/0275268 A1    Sep. 1, 2022

Related U.S. Application Data
(60) Provisional application No. 62/931,653, filed on Nov. 6, 2019, provisional application No. 62/871,969, filed on Jul. 9, 2019.

(51) Int. Cl.
*C09K 8/594* (2006.01)
*C09K 8/584* (2006.01)
*C09K 8/60* (2006.01)

(52) U.S. Cl.
CPC .............. *C09K 8/594* (2013.01); *C09K 8/584* (2013.01); *C09K 8/602* (2013.01); *C09K 8/604* (2013.01)

(58) Field of Classification Search
None
See application file for complete search history.

(56) References Cited

U.S. PATENT DOCUMENTS

| | | | |
|---|---|---|---|
| 5,344,956 A | 9/1994 | Allewaert | |
| 6,562,605 B1 * | 5/2003 | Beckman | C07K 1/145 435/814 |

(Continued)

FOREIGN PATENT DOCUMENTS

| | | |
|---|---|---|
| CA | 2838828 | 12/2012 |
| CA | 2849276 | 3/2013 |

(Continued)

OTHER PUBLICATIONS

McLendon, W. et al., Assessment of CO2-soluble non-ionic surfactants for mobility reduction using mobility measurements and CT imaging, Journal of Petroleum Science and Engineering, vol. 119 pp. 196-209 Published: Jul. 2014.

(Continued)

*Primary Examiner* — John J Figueroa
(74) *Attorney, Agent, or Firm* — BARTONY & ASSOCIATES, LLC Note: If the $\gamma_{H2O\text{-}oil}$ value is ultralow due to the surfactant, then the alteration of wettability may not have a significant effect on improving the displacement of oil

(57) ABSTRACT

A method of recovering hydrocarbons from a subterranean formation includes injecting into the subterranean formation a composition including carbon dioxide and at least one carbon-dioxide-soluble compound under conditions favorable to diffusion into and adsorption of the carbon-dioxide-soluble compound on the subterranean formation so that oil-wettability is decreased or water wettability or $CO_2$-philicity is increased in at least a portion the subterranean formation.

15 Claims, 14 Drawing Sheets

(56) References Cited

U.S. PATENT DOCUMENTS

| | | | |
|---|---|---|---|
| 6,767,626 | B2 | 7/2004 | Tuminello |
| 9,163,496 | B1* | 10/2015 | Kelly ............... E21B 43/261 |
| 9,458,707 | B2 | 10/2016 | Sanders |
| 9,850,421 | B2 | 12/2017 | Abbas |
| 9,932,808 | B2 | 4/2018 | Sheng |
| 2009/0288825 | A1 | 11/2009 | Tang |
| 2012/0125616 | A1 | 5/2012 | Graue |
| 2014/0014375 | A1 | 1/2014 | Boerrgter |
| 2014/0110117 | A1* | 4/2014 | Abbas ............... E21B 43/164 166/300 |
| 2014/0224484 | A1* | 8/2014 | Abbas ............... E21B 43/164 166/270.1 |
| 2015/0247392 | A1 | 9/2015 | Portwood |
| 2017/0044422 | A1* | 2/2017 | Abbas ............... C09K 8/584 |
| 2017/0159416 | A1 | 6/2017 | Sheng |
| 2018/0037809 | A1 | 2/2018 | Frattarelli |
| 2018/0087362 | A1 | 3/2018 | Li |
| 2019/0316029 | A1* | 10/2019 | Enick ............... C09K 8/588 |

FOREIGN PATENT DOCUMENTS

| | | |
|---|---|---|
| CA | 2850140 | 4/2013 |
| CN | 105505344 A | 4/2016 |
| CN | 108194065 A | 6/2018 |
| WO | WO2016053237 A1 | 4/2016 |
| WO | WO2018075237 A1 | 4/2018 |
| WO | WO2018146107 A1 | 8/2018 |
| WO | WO2021007388 | 1/2021 |

OTHER PUBLICATIONS

Xing, D. et al.; CO2-Soluble, Nonionic, Water-Soluble Surfactants That Stabilize CO2-in-Brine Foams, SPE Journal vol. 17 Issue: 4 pp. 1172-1185 Published: Dec. 2012.

McHugh, M. et al., Solid solubilities of naphthalene and biphenyl in supercritical carbon dioxide; J. Chem. Eng. Data, vol. 25, No. 4, 1980—326-329.

Zhang, D.; Numerical simulation of the effects of slurry properties on displacement efficiency; Advances in Petroleum Exploration and Development, 8(2) 2014, 29-32.

Qiu, J.; Charleux, B.; Matyjaszewski, K., Controlled/living radical polymerization in aqueous media: homogeneous and heterogeneous systems, Prog. Polym. Sci. 2001, 26, 2083-2134.

Ashare, Edward et al, Falling Cylinder Viscometer For Non-Newtonian Fluids, A.I.Ch.E. Journal, vol. 11, No. 5, Sep. 1965, 910-916.

Chvvis, R. W et al.; Pressure-Activated Sealant Economically Repairs Casing Leaks on Prudhoe Bay Wells; Society of Petroleum Engineers, (2009), SPE 120978, 1-11.

Carey, Bill; Wellbore Integrity and CO2 Sequestration; Los Alamos National Laboratory (2010); 1-31.

Xu, Jlanhang et al., Thickening Carbon Dioxide with the Fluorocrylate-Styrene Copolymner, SPE Journal, Jun. 2003, 85-91.

Dahl, J. et al; Uses of Small Particle Size Cement in Water and Hydrocarbon Base Slurries; Journal of Canadian Petroleum Technology, (1993), 32(9), 25-27.

Doherty, Mark D. et al; Small Molecule Cyclic Amide and Urea Based Thickeners for Organic and sc-CO2/Organic Solutions; Energy Fuels (2016), 30, 5601-5610.

Engelke, B. et al; CO2 Self-Healing and Resistant Cement Technology from Laboratory to the Field; SPE/IADC-184641-MS (2017), 1-10.

Huang, Zhihua et al., Enhancement of the Viscosity of Carbon Dioxide Using Styrene/Fluoroacrylate Copolymers; Macromolecules (2000), 33, 5437-5442.

Desimore, J.M. et al., Synthesis of Fluoropolymers in Supercritical Carbon Dioxide; Science, 1992,257 (14), 945-947.

Hong, Lei et al., Global phase behavior for CO2-philic solids: the CO2+Beta-D-maltose octaacetate system, J. of Supercritical Fluids, 34 (2005), 11-16.

Wildenborg, Ton et al., Genetic failure models for well integrity under exposure to CO2, Global CCS Institute, (2017), 1-100.

Jones, P. J. et al., Unconventional remediation in the utica shale using advanced resin technologies, Society of Petroleum Engineers, SPE 165699 (2013), 1-6.

Mawson, Simon et al., Formation of poly(1, 1,2,2-tetrahydroperfluorodecyl acrylate) submicron fibres and particles from supercritical carbon dioxide solutions; Mactomolecules (1995), 28,3182-3191.

Miller, Matthew B. et al., Solid CO2-philes as potential phase-change physical solvents for CO2; J. of Supercritical Fluid 61 (2012) 212-220.

Jones, P.J. et al., Rigless operation to restore wellbore integrity using synthetic-based resin sealants; Society of Petroleum Engineers, SPE 167759 (2014), 1-9.

Luna-Barcenas, Gabriel et al., Phase behavior of poly(1,1-dihydroperfluorooctylacrylate) in supercritical carbon dioxide; Fluid Phase Equilibria 146 (1998) 325-337.

McClain, J. B. et al., Characterization of polymers and amphiphiles in supercritical CO2using small angle neutron scatteringand viscometry; Science and Engineering, vol. 74, 1996, 234-235.

Memon, Khalil Rehman et al., Durability and rheological evaluation of cement slurries from atmospheric to high thermal condition; Journal of Applied Scienes 14 (11): 1204-1209,2014.

Morris, Kay A. et al., Resin-based cement alternatives for deepwater well construction; Society of Petroleum Engineers, SPE 155613 (2012), 1-7.

Odiete, William E. et al., Modeling the flow behavior of cement slurry with temperature; int. J. Curr. Sc. 2015, 14: E 70-73.

Oil & Gas Technology, pressure-activated sealants, Sep. 11, 2006, 28-31.

Rusch, D., et al; .; Use of Pressure Activated Sealants to Cure Sources of Casing Pressure; Society of Petroleum Engineers, SPE 55996, SPE Western regional Meeting, May 26-28, 1999, 1-6.

Rusch, D., et al; Microannulus leaks repaired with pressure-activates sealant; Society of Petroleum Engineers, SPE 91399; SPE Eastern Regional Meeting Sep. 15-17, 2004, 1-7.

Rusch, D., et al; Annulus communications eliminated using pressure-activated sealant; Spring Conf of the Soln Mining Research Inst, Apr. 17-20, 2005, Syracuse, NY, 1-11.

Shen, Z. et al., CO2-solubility of oligomers and polymers that contain the carbonyl group; Polymer 44, 2003, 1491-1498.

Shahriar, Anjuman et al., Rheological properties of oil well cement slurries; Construction Materials 165(1) 25-44, Feb. 2012.

Offshore Source article; Apr. 2006, p. 30.

Poston, T.; Commell, K.; Daikin America, Inc presentation, Oct. 2013, 1-23.

Rusch, D., et al; Internal repair of pipeline leaks using pressure-activates sealeant; Society of Petroleum Engineers, SPE 91400, SPE Eastern Regional Meeting, Sep. 15-17, 2004, 1-9.

Rusch, D., Subsea leaks cured with pressure-activated sealant; Society of Petroleum Engineers, SPE SPE 88566, SPE Asia Pacific Oil and Gas Conference, Oct. 18-20, 2004, 1-7.

Russell, Mark H., et al., Investigation of biodegradation potential of a fluoroacrylate polymer product in aerobic soils; Environmental Science & Technology, 2008, 42, 800-807.

(56) References Cited

OTHER PUBLICATIONS

Shahriar, Anjuman; PhD thesis, Univ. of Western Ontario, 2011, 1-251.
Al Al Yousef, Zuhair Ali; Study of CO2 Mobility Control in Heterogeneous Media Using CO2 Thickening Agents, MS thesis, Texas A&M University, Aug. 20121, 1-144.
Bae, J.H., et al., A Laboratory Investigation of Viscosified CO2 Process, SPE 20467 (Sep. 1990) published as SPE Advanced Technology Series, vol. 1, No. 1, Apr. 1993, pp. 166-171.
Blasing, Andre at al., Effect of Concentration and degree of saturation on RESS of a CO2-soluble fluoropolymer; Ind. Eng. Chem. Res., 2002, 41, 4976-4983.
Cai, S.; Study of CO2 Mobility Control Using Cross-Linked Gel Conformance Control and CO2 Viscosifiers in Heterogeneous Media, MS Thesis, Texas A&M University, Aug. 2010; 1-152.
Dhwe, Aman et al., Assessment of solubility and viscosity of ultra-high molecular weight polymeric thickeners in etahne, propane and butane for miscible EOR; J of Pet Sc and Eng, IF 1.1, 145 (2016) 266-278.
Teodoriu, Catalin et al., Wellbore integrity and cement failure at HPHT conditions; Int J Eng Ap Sc, 2013,2(2) 1-13.
Teixeira, G. T. et al., New material for wellbore strengthening and fluid losses mitigation in deepwater drilling scenario; Society of Petroleum Engineers, PE-170266-MS, 2014, 1-12.
Urdaneta, J.A. et al., Novel gas shutoff resin system for well abandonment application in Colombia: A case History; SPE 169400, SPEW Latin American and Caribbean Petroleum Engineering Conference May 21-23, 2014 ; 1-7.
Washington, John W. et al., Characterizing Fluorotelomer and Polyfluoroalkyl Substances in New and Aged Fluorotelomer-Based Polymers for Degradation Studies with GC/MS and LC/MS/MS; Environ. Sci. Technol. 2014, 48, 5762-5769.
Washington, John W. et al.,Degradability of an Acrylate-Linked, Fluorotelomer Polymer in Soil; Environ. Sci. Technol. 2009, 43, 6617-6623.
Washington, John W.; Response to Comments on Degradability of an Acrylate-Linked, Fluorotelomer Polymer in Soil; Environmental Science and Technology 44(2):849-50.
Washington, John W. et al.; Decades-scale degradation of commercial, side-chain, fluorotelomer-based polymers in soils and water; Env. Science & Technology, 2015, 49, 915-923.
Washington, John W. et al.; Abiotic hydrolysis of fluorotelomer-based polymers as a soure of perfluorocarboxylates at the global scale; Environmental Science & Technology, 2015, 49, 14129-14135.
Foianibi, I. et al., Cement evaluation behind thicck-walled casing with advanced ultrasonic pulse-echo technology: pushing the limit; SPWLA 54th Annual Logging Symposium, Jun. 22-26, 2013; 1-9.
Matyjaszewski, K., Ed. Controlled Radical Polymerization; ACS: Washington, D. C., 2015, 1-17.
Matyjaszewski, K., Controlled Radical Polymerization; ACS Symposium Series 768, 1998, Chapter 1 pp. 2-30, Chapter 16 pp. 258-283.
Matyjaszewski, K. Controlled/Living Radical Polymerization. Progress in ATRP, NMP, and RAFT, ACS Symposium Series 768, 2000, Chapter 1 pp. 1-26, Chapter 24 pp. 347-360 and Chapter 25 pp. 361-371.
Davis, K. A.; Matyjaszewski, K., Statistical, Gradient, Block, and Graft Copolymers by Controlled/Living Radical Polymerizations, Adv. Polym. Sci. 2002, 159, 1-168.

* cited by examiner

Switchable 0 wt% Surfactant 0.01 wt%      0.1 wt%     1 wt%

METHOD OF OIL RECOVERY USING COMPOSITIONS OF CARBON DIOXIDE AND COMPOUNDS TO INCREASE CARBON DIOXIDE WETTABILITY OF FORMATIONS

CROSS-REFERENCE TO RELATED APPLICATIONS

This application is a national phase filing of PCT International Patent Application No. PCT/US2020/041320, filed Jul. 9,2020, which claims benefit of U.S. Provisional Patent Application Ser. No. 62/871,969, filed Jul. 9, 2019, and U.S. Provisional Patent Application Ser. No. 62/931,653, filed Nov. 6, 2019, the disclosures of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Carbon dioxide ($CO_2$) has been used to fracture wells and/or to recover oil from shale that has already been fractured based on its solvent strength for oil, its ability to reduce oil viscosity and its ability to swell oil and extract light components therefrom. In conventional, relatively high-permeability formations, solutions of carbon dioxide and a nonionic, water soluble surfactants have been used as foaming agents during production. In those processes, a portion of the water-soluble surfactant dissolved into the brine within the subterranean formation to form a foam. Such carbon-dioxide-in-brine foams have been used in both sandstone and carbonate conventional formations in an attempt to make carbon dioxide "appear" to be more viscous for improved mobility control and/or conformance control. The bulk of the surfactant partitions into the water/brine in forming the foam.

In the use of $CO_2$-surfactant for the generation of mobility control foams during EOR in conventional carbonate and sandstone formations, the foremost objective of the surfactant in such conventional EOR is to stabilize thin water lamellae within the pores that separated droplets of liquid or supercritical $CO_2$. The resultant "emulsion" or "foam" will exhibit a much higher apparent viscosity than neat $CO_2$ and, therefore, viscous fingering may be suppressed. In such procedures it is desired to minimize adsorption of the surfactant as much as possible to maximize the transport of the foam toward the production well. Before the advent of $CO_2$-soluble surfactants, mobility control foams were generated in situ via alternating injection of an aqueous surfactant solution and high-pressure gas $CO_2$ (that is, aqueous surfactant-alternating-gaseous $CO_2$ or SAG) within the sandstone or carbonate. However, when it was found that nonionic surfactants were slightly $CO_2$-soluble, it became possible to generate foams in situ by dissolving the surfactant in the injected $CO_2$ and permitting the solution to mix with the formation brine. In accordance with Bancroft's rule (which states that the foam or emulsion-stabilizing or foam-stabilizing surfactant is more soluble in the continuous, low volume fraction, thin film phase than in the discontinuous, high volume fraction, droplet phase), the desired $CO_2$-in-water configuration of the foam (as opposed to a water droplet-in-$CO_2$ suspension) was realized by selecting a surfactant that was more soluble in the brine than in $CO_2$. Therefore, the surfactant started out dissolved in the $CO_2$ phase as it entered the well, but once in contact with formation brine a significant amount of the surfactant would partition into the brine. Subsequently, as the fluids mixed within the pores of the sandstone or carbonate the surfactants in the brine would stabilize the $CO_2$-in-brine foams or emulsions.

It has also been proposed to include water-soluble surfactants within water used to fracture subterranean formations to have the surfactants adsorb into shale to render it more water-wettable, which tends to displace oil from the shale. Aqueous surfactant solutions have also been proposed for enhanced oil recovery in previously fractured shale formations. However, as a result of circumstances such as the relatively high viscosity of water and the relatively low solubility of hydrocarbons in water, such aqueous surfactant solution have shown very limited success even in the conventional, relatively high permeability formations in which they are used. It remains desirable to develop further procedures for enhanced oil recovery, particularly in lower permeability and unconventional subterranean formations.

SUMMARY

In one aspect, a method of recovering hydrocarbons from a subterranean formation includes injecting into the subterranean formation a composition including carbon dioxide and at least one carbon-dioxide-soluble compound under conditions favorable to diffusion into and adsorption of the carbon-dioxide-soluble compound on the subterranean formation so that oil-wettability is decreased or water wettability or $CO_2$-philicity is increased in at least a portion the subterranean formation. In a number of embodiments, the method further includes allowing the composition to soak in the subterranean formation under conditions favorable to diffusion into and adsorption of the carbon-dioxide-soluble compound on the subterranean formation for an extended period of time after injection thereof without production from the subterranean formation. In a number of embodiments, no injection occurs during the extended period of time.

In a number of embodiments, the at least one carbon-dioxide-soluble compound is a surfactant, an amphiphilic polymer, or a ketone which is carbon-dioxide-soluble at a pressure under which the composition enters the subterranean formation. The at least one carbon-dioxide-soluble compound may, for example, be a nonionic surfactant or an amphiphilic polymer.

In other embodiments, the at least one carbon-dioxide-soluble compound is a ketone. The ketone may, for example, have no more than 20 carbons or no more than 11 carbons. In a number of embodiments, the ketone is acetone, a pentanone, or a butanone.

In a number of embodiments, the conditions favorable to diffusion into and adsorption of the carbon-dioxide-soluble compound on the subterranean formation include a pressure in the range of 1000 psi (6.89 Megapascal) to 10,000 psi (68.95 Megapascal). The pressure may, for example, be in the range of 1000 psi (6.89 Megapascal) to 5,000 psi (34.47 Megapascal). In general, the pressure is about the cloud point for the at least one carbon-dioxide-soluble compound.

In a number of embodiments, the carbon-dioxide-soluble compound is a surfactant or an amphiphilic polymer which includes at least one hydrophobic segment which is carbondioxide-philic which is attached to at least one other segment which is less carbon-dioxide-philic. The at least one hydrophobic segment which is carbon-dioxide-philic may, for example, be attached to the at least one other segment via a linker. The at least one hydrophobic segment which is carbon-dioxide-philic may, for example, include a linear or branched alkyl group, an aromatic group, a cyclic group, an alkyl group attached to an aromatic or cyclic group, an oligomer of propylene glycol, an oligomer of propylene glycol attached to an alkyl group.

In a number of embodiments, the at least one other segment is hydrophilic. The at least one other segment may, for example, be a polymer or an oligomer of an alkylene oxide. In a number of embodiments, the at least one other segment is an oligomer of ethylene oxide or propylene oxide.

The at least one carbon-dioxide-soluble compound is water soluble in a number of embodiments. In other embodiments, the at least one carbon-dioxide-soluble compound is oil soluble.

In a number of embodiments, the subterranean formation is an unconventional formation, a low-permeability formation or a moderate-permeability formation. In a number of embodiments, the subterranean formation is an unconventional formation.

In another aspect, a method of altering a subterranean formation includes injecting into the subterranean formation a composition including carbon dioxide and at least one carbon-dioxide-soluble compound under conditions favorable to diffusion into and adsorption of the carbon-dioxide-soluble compound on the subterranean formation to at least one of decrease the oil-wettability or increase the water wettability or $CO_2$-philicity of the at least a portion of the subterranean formation. In a number of embodiments, the method further includes allowing the composition to soak in the subterranean formation under conditions favorable to diffusion into and adsorption of the carbon-dioxide-soluble compound on the subterranean formation for an extended period of time after injection thereof without production from the subterranean formation. In a number of embodiments, no injection occurs during the extended period of time.

In still another aspect, a method of altering a substrate includes injecting into the substrate a composition including carbon dioxide and at least one carbon-dioxide-soluble compound under conditions favorable to diffusion into and adsorption of the carbon-dioxide-soluble compound on the substrate to at least one of decrease the oil-wettability or increase the water wettability or $CO_2$-philicity of at least a portion of the substrate. In a number of embodiments, the method further includes allowing the composition to soak in the substrate under conditions favorable to diffusion into and adsorption of the carbon-dioxide-soluble compound on the substrate for an extended period of time after injection thereof without production from the subterranean formation.

The present systems, methods and compositions, along with the attributes and attendant advantages thereof, will best be appreciated and understood in view of the following detailed description taken in conjunction with the accompanying drawings.

DESCRIPTION

Figure 1:
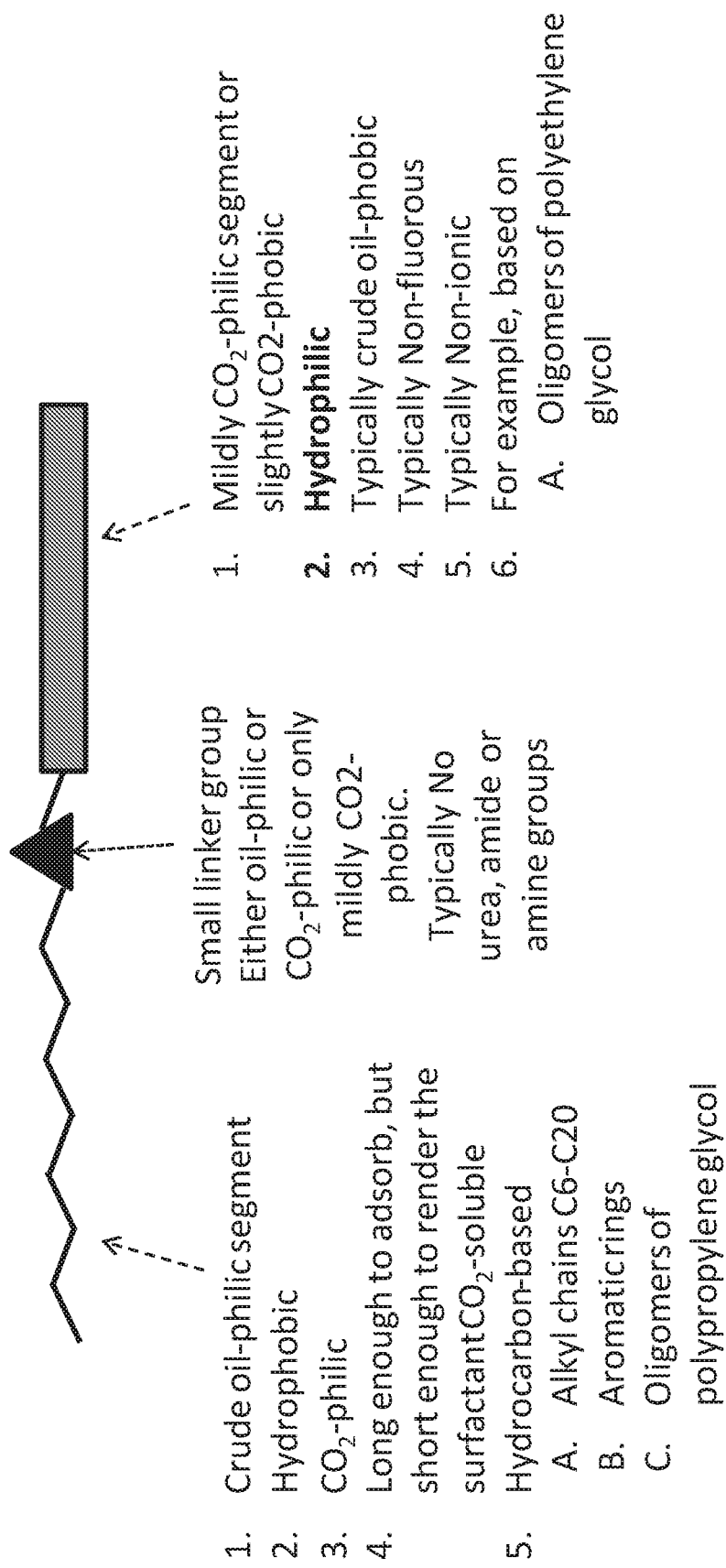
FIG. 1 illustrates an idealized structure of a wetting agent or surfactant suitable for use herein.

The present devices, systems, methods and compositions, along with the attributes and attendant advantages thereof, will best be appreciated and understood in view of the following description taken in conjunction with any accompanying drawings.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a compound" includes a plurality of such compounds and equivalents thereof known to those skilled in the art, and so forth, and reference to "the compound" is a reference to one or more such compounds and equivalents thereof known to those skilled in the art, and so forth. Recitation of ranges of values herein are merely intended to serve as a shorthand method of referring individually to each separate value falling within the range. Unless otherwise indicated herein, and each separate value as well as intermediate ranges are incorporated into the specification as if it were individually recited herein. All methods described herein can be performed in any suitable order unless otherwise indicated herein or otherwise clearly contraindicated by the text.

In a number of embodiments, the systems, methods and compositions hereof provide, for example, for enhanced hydrocarbon/oil recovery (sometimes referred to herein as EOR) in subterranean formations (for example, unconventional subterranean formations, low-permeability formations and moderate-permeability formations) through the use of carbon-dioxide-solubilized compounds that are effective to reduce hydrocarbon/oil wettability and/or increase water wettability of at least a portion of a subterranean formation. Unlike previously used $CO_2$-surfactant solutions to produce emulsions or foams for EOR in conventional formations, the objective for EOR in the systems and methods hereof is wettability alteration via adsorption of surfactant. In a number of embodiments hereof, the at least one carbon-dioxide-soluble compound is a wettability-altering agent such as a surfactant or a ketone which is carbon-dioxide-soluble at a pressure under which the composition enters the subterranean formation. In a number of embodiments, wettability-altering/changing agents hereof are surfactants (which are typically amphiphilic polymers) or other amphiphilic polymers that alter wettability of a subterranean formation (for example, via adsorption).

In the systems and methods hereof, a composition or substance including carbon dioxide and at least one carbon-dioxide- or $CO_2$-soluble compound is injected into a substrate such as a subterranean formation to, for example, reduce hydrocarbon/oil wettability and/or increase $CO_2$-philicity/wettability and/or water wettability of at least a portion of the subterranean formation. The compositions may, for example, enhance hydrocarbon/oil recovery from the subterranean formation. In a number of embodiments, the subterranean formation is an unconventional formation or unconventional liquid reserve (sometime referred to herein as a ULR). In general, unconventional formations or unconventional liquid reserves include extremely tight reservoirs (having a permeability in the range of approximately 0.0001-0.001 mD), very tight reservoirs (having a permeability in the range of approximately 0.001-0.01 mD) and tight formations having a permeability in the range of approximately (0.01-0.1 mD). Shale is one example of an unconventional formation or ULR. Other unconventional formations or ULRs may, for example, include tight sands. In contrast, conventional formations have permeability values in the range of approximately 0.1-1.0 mD for low permeability reservoirs, approximately 1.0-10 mD for moderate permeability reservoirs, approximately 10-100 mD for high permeability reservoirs, and even greater permeability values for very high permeability reservoirs. Although the systems, methods and compositions hereof are particularly well suited for use in unconventional formations or ULRs, low-permeability formations and moderate-permeability formations (that is, subterranean formations with permeabilities less than 10 mD), the systems methods, and compositions hereof may be used in connection with other subterranean formations to achieve at least one of decreasing the oil-wettability or increasing the water wettability of the subterranean formation.

In unconventional, low-permeability formations or liquid reserves, bulk flow of fluids via a pressure gradient is severely limited or not possible. Without limitation to any mechanism, the carbon-dioxide-soluble compound(s) hereof diffuse into and adsorbs onto the subterranean formation/shale to make the formation less oil wet and/or more water wet while simultaneously exploiting the hydrocarbon/oil solvent strength and low viscosity of $CO_2$. As used herein, the term carbon-dioxide-soluble or $CO_2$-soluble refers to compounds that will dissolve in sufficient concentration in $CO_2$ in the pressure range of injection into the formation to be effective wettability-altering agents. In general, the pressures under which the compositions hereof are injected into a subterranean formation are above 1000 psi (for example, in the range of 1000 to 10,000 psi). The compound or compounds hereof may, for example, be present in the composition at a concentration of less than 5 wt % or less than 1 wt %. In a number of embodiments in which surfactants are used, the compounds are present in the range 0.005 wt % to 5 wt %, 0.005 wt % to 1 wt % or 0.1 wt % to 1 wt %.

The compound or compounds of the compositions hereof may, for example, be an amphiphilic polymer, which functions as a surfactant or wettability changing agent, or a ketone which functions as a wetting agent which is carbon-dioxide-soluble at a pressure under which the composition is injected into the formation. In a number of embodiments, the at least one compound is a nonionic surfactant or wetting agent or a ketone.

The term "polymer" refers generally to a molecule of high relative molecular mass, the structure of which includes repeat units derived, actually or conceptually, from molecules of low relative molecular mass (monomers). The term "oligomer" refers generally to a molecule of intermediate relative molecular mass, the structure of which includes a small plurality of units derived, actually or conceptually, from molecules of lower relative molecular mass (monomers). In general, a polymer (which encompasses oligomers) is a compound having >1, and more typically >10 repeat units or monomer units, while an oligomer is a compound having >1 and <20, and more typically <10 repeat units or monomer units. As used herein, the term "amphiphilic" refers generally to molecules having a group which has greater water-solubility (for example, an alkylene oxide) attached to a group having a lower water-insolubility and greater oil solubility (for example, a hydrocarbon chain).

As, for example, illustrated schematically in FIG. 1, wettability-altering agents (such as surfactants) hereof may, for example, include a hydrophobic (or oil-philic) segment which is carbon-dioxide-philic and at least one other segment attached thereto which is less carbon-dioxide-philic. The at least one other segment may, for example, be mildly carbon-dioxide-philic or slightly carbon-dioxide-phobic. In a number of embodiments, the at least one other segment is hydrophilic. The at least one other segment may, for example, be a hydrophilic polymer or oligomer (for example, an ethylene oxide oligomer). The hydrophobic segment and the carbon-dioxide-philic segment are typically linked via a small linker group.

In a number of embodiments, wettability-altering agents (such as surfactants) suitable for use herein are water soluble. However, in other embodiments, the wettability-altering agent used herein are oil-soluble. Moreover, such wettability-altering agents may not be significantly soluble in either water or oil. In the case of polymeric/oligomeric water-soluble wettability-altering agents or surfactants, the at least one other segment may be a longer hydrophilic segment than is the case of an oil-soluble surfactants. A representative water-soluble wettability-altering agent may, for example, include such a segment (other segment) including at least nine ethylene oxide repeat units whereas a representative oil-soluble wetting agent or surfactant may, for example, include a segment including less than nine (for example, three to seven) ethylene oxide units.

The dissolution of ionic and nonionic wettability-altering agents or surfactants in water is quite commonplace in multiple technologies ranging from the oilfield to household cleaners and personal care products. There are also numerous oil-soluble surfactants that are in use in the chemical and petroleum industries. Because water and oil are the two most common base fluids for the preparation of surfactant formulations, surfactants are commonly characterized as water-soluble, oil-soluble or something in between (that is, water-dispersible). Considering a simple nonionic surfactant composed of an oil-philic/hydrophobic alkyl tail and a hydrophilic oligomeric ethylene oxide ($EO_n$ where n is the number of EO units, also known as polyethylene glycol or PEG) head group. If there are 12 carbons in the alkyl tail ($C_{12}$) and an $EO_{12}$ head group, the $C_{12}EO_{12}$ surfactant will be water-soluble. However, if a $C_{12}$ tail is joined to an $EO_3$ head group, the $C_{12}EO_3$ surfactant would be oil-soluble.

However, nonionic wettability altering agents or surfactants can be dissolved in fluids other than water and oil. The high-pressure gas-based injectants being used for EOR in unconventional liquid reserves or ULRs assist in achieving solubility. Nonionic wettability-altering agents or surfactants are essentially insoluble in high pressure nitrogen or methane. However, it is known that small concentrations of nonionic water-soluble or oil-soluble surfactants can be dissolved in high pressure $CO_2$. Given that some surfactants can be dissolved in concentrations as high as 30-50 wt % in water, this small solubility of some nonionic surfactants in $CO_2$ (for example, in the range of 0.1-1.0 wt %) may appear insignificant, but this level of solubility may be more than adequate for the oilfield applications described herein.

The solubility of nonionic wettability-altering agents or surfactants in $CO_2$ can be attributed to the unique properties of $CO_2$. $CO_2$ has good solvent strength for light hydrocarbons, which is one of the foremost reasons that it has been used successfully in EOR in conventional formations for about five decades. The results from numerous phase behavior studies have provided an explanation of the solvent strength of $CO_2$ for nonionic surfactants, oligomers and polymers. Although $CO_2$ is not polar (no dipole moment), it does have a quadrupole moment that can be exploited for dissolving oxygen-rich hydrocarbons including polymeric alkylene oxides such as $EO_n$ and oligomers of propylene oxide ($PO_n$) that are commonly found in nonionic surfactants. In that regard, although $CO_2$ is symmetric (O=C=O) and non-polar, the oxygen atoms at the ends of $CO_2$ are electron-rich while the carbon atom is electron poor. Therefore $CO_2$ has a significant quadrupole moment. As a result, the C and O atoms of $CO_2$ can have thermodynamically favorable Lewis acid-Lewis base interactions or favorable weak hydrogen bonding interactions with oxygenated hydrocarbon groups such as ethers, acetates, esters, carbonyls (but not alcohols or carboxylic acids). For example, the electropositive C atom of $CO_2$ may interact favorably with the electronegative O atom of a polyether, while the O atoms of the $CO_2$ interact favorably with the protons (hydrogen atoms) in the polyether chain. Low surface energy, highly branched (that is, methylated) alkyl tails exhibit greater $CO_2$-solubility than linear (that is, normal) alkyl groups. Therefore, the short $EO_n$ oligomer of the nonionic wettability-altering agent/surfactant exhibits a small affinity for $CO_2$ (it is slightly $CO_2$-philic), and the $PO_n$ functionality is even more $CO_2$-philic than $EO_n$. The terminal hydroxyl group (—OH) of either the $EO_n$ or $PO_n$ chain is $CO_2$ phobic, however. As a result, it is possible to dissolve small concentrations (for example, 0.1 to 1.0 wt %) of many commercially available, inexpensive, oil-soluble or water-soluble nonionic wettability-altering agents/surfactants in high pressure $CO_2$.

Figure 2A:
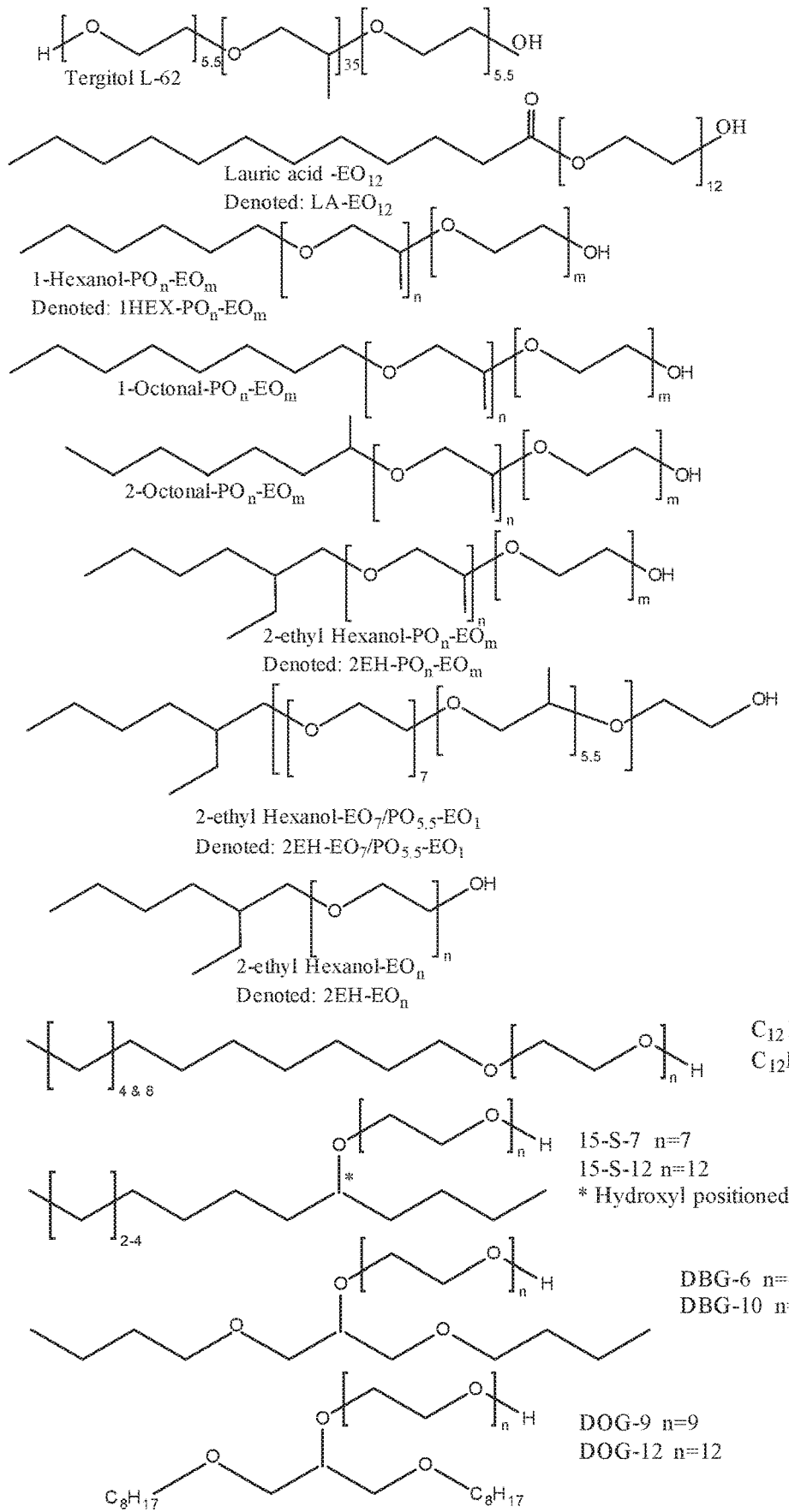
FIG. 2A illustrates structures of representative water-soluble surfactants that have been used in forming $CO_2$-in-water foams that are suitable for use as wetting agents in embodiments hereof.
Figure 2A:
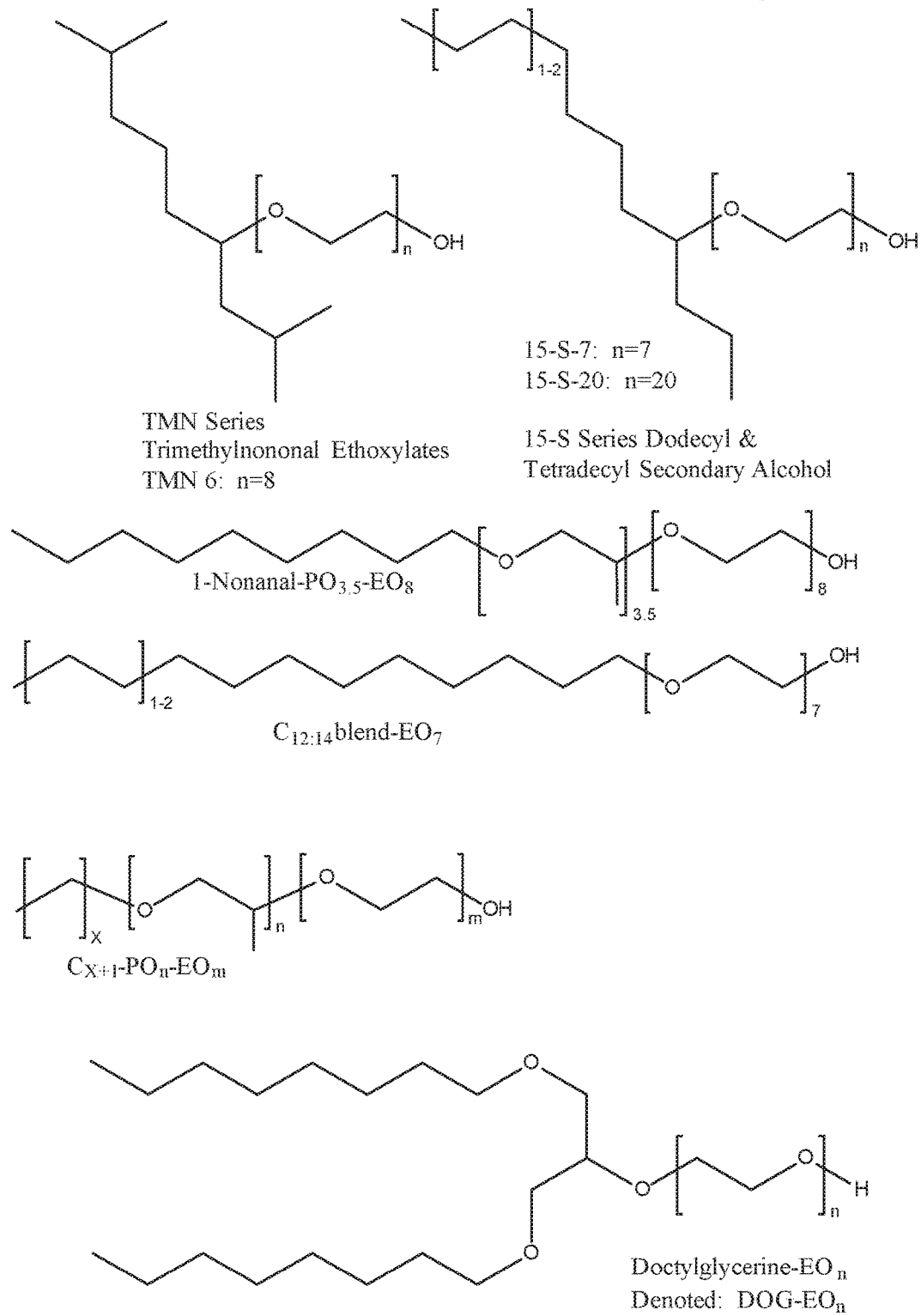
Figure 2B:
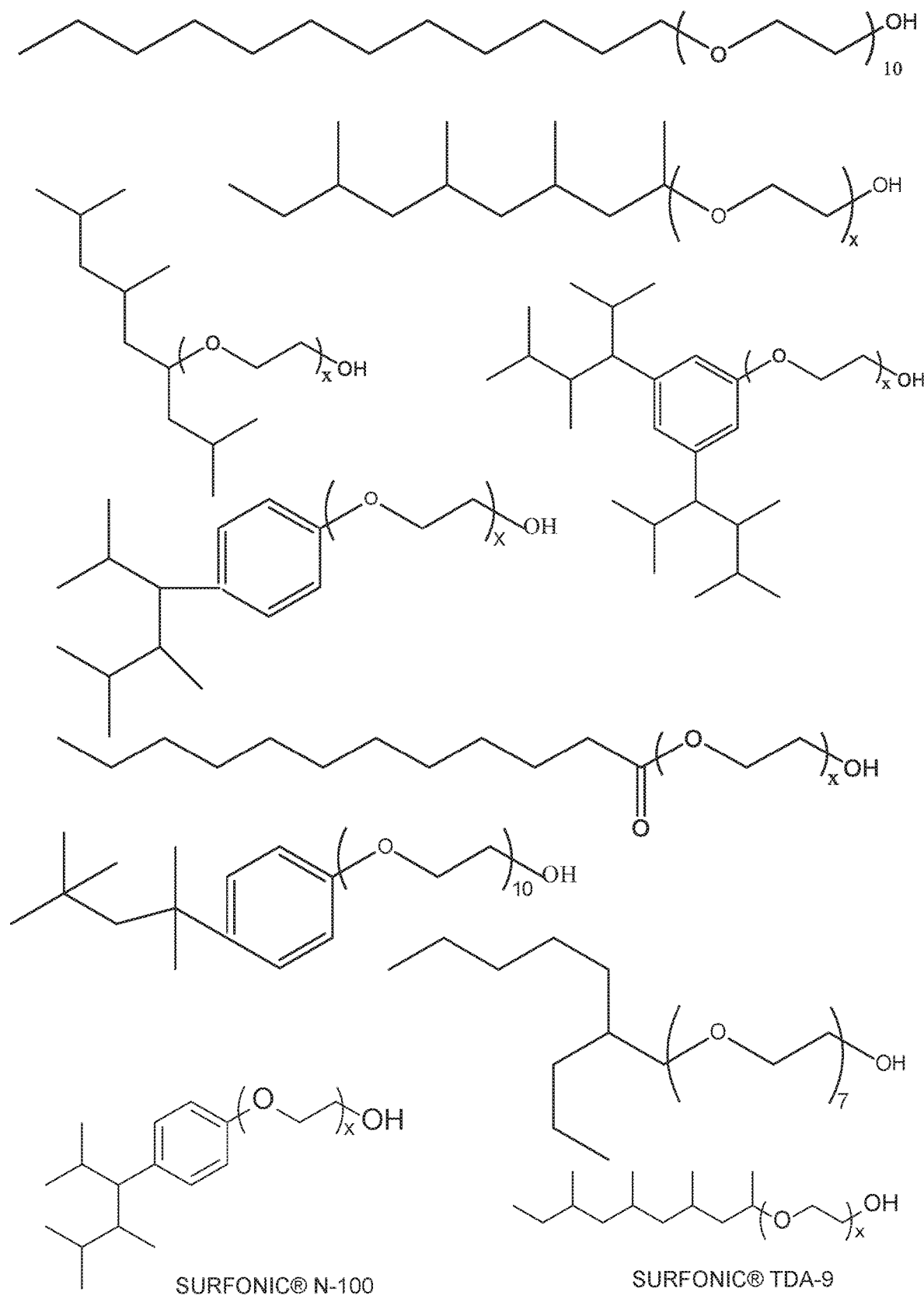
FIG. 2B illustrates structures of further representative surfactants suitable for use as wetting agents in embodiments hereof.

There is an extensive amount of work related to $CO_2$-soluble, highly fluorinated surfactants with fluoroalkyl, fluoroacrylate, and fluoroether-based $CO_2$-philic segments. However, these surfactants are very expensive and have problematic environmental and health-related profiles. Further, it is extremely difficult to dissolve non-fluorinated ionic surfactants in $CO_2$ unless one employs inherently expensive, specialty surfactants with highly $CO_2$-philic oxygenated hydrocarbon or silicone ligands. For example, twin-tailed surfactants with extremely $CO_2$-philic oligomeric vinyl acetate twin tails have been synthesized. That anionic surfactant (with a sodium counterion) is soluble to at least 4 wt % in $CO_2$, but the surfactant is not commercially available and (as a result of its complex synthetic route) would be extremely expensive to commercialize. Although other types of wettability-altering agents or surfactants may be used in the systems and methods hereof, because of environmental and cost considerations, representative studies hereof have been restricted to commercially available, hydrocarbon-based nonionic surfactants. Representative examples of hydrocarbon-based nonionic surfactants suitable for use herein are illustrated in FIGS. 2A and 2B.

There have been a large number of studies related to identifying reasonably priced, non-fluorous surfactants that were designed and marketed for solubility in water or oil, but also exhibit some solubility in high pressure $CO_2$. Most of the $CO_2$-soluble nonionic surfactants described in previous studies, some of which are illustrated in, for example, FIGS. 2A and 2B are composed of an oil-philic, hydrophobic group composed of a linear or branched alkyl chain with or without an aryl group (that is, benzene ring) coupled to a hydrophilic polyethylene oxide (that is, PEO, $EO_n$, polyethylene glycol, PEG). Some surfactants include a polypropylene oxide (PPO, $PO_n$) group between the alkyl tail and the PEO head group. Because prior research efforts focused on surfactants that were both slightly $CO_2$-soluble and very water-soluble (see FIG. 2A), the PEO segments usually had seven or more EO groups. Oil-soluble nonionic surfactants with short PEO chains would also be $CO_2$-soluble under the conditions used in the systems and methods hereof.

Figure 3:
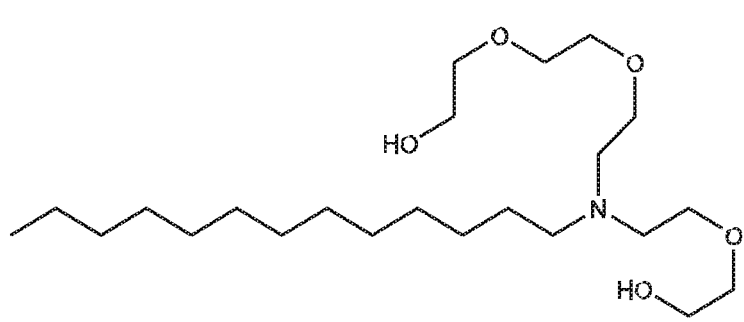
FIG. 3 illustrates structures of representative switchable surfactants suitable for use as wetting agents herein.
Figure 3:
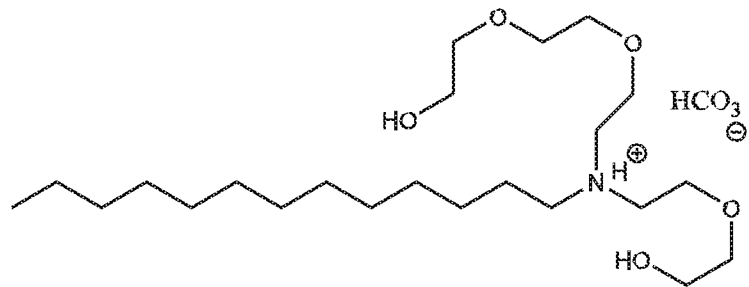

There have also been studies of "switchable" ethoxylated amine surfactants that are manufactured in nonionic form (unprotonated amine) and switch into cationic surfactants (protonated amine, $HCO_3^{-1}$ counterion) in acidic brine under reservoir conditions. A representative example of a switchable surfactant is illustrated in FIG. 3. Those compounds are examples of switchable surfactants that dissolve in either $CO_2$ or brine. When the $CO_2$-rich phase that contains a dissolved nonionic switchable surfactant contacts brine, a significant portion of the nonionic surfactant will partition into the brine. Because the brine is in contact with high pressure $CO_2$, the brine will be acidic (pH as low as 3) as a result of the formation of carbonic acid. The nonionic surfactant in the brine will then transform (or "switch") into a cationic form.

In a representative studies hereof, a number of nonionic surfactants were dissolved in $CO_2$ to achieve an increased water and or $CO_2$ wettability in shale thereby providing another mechanism for the $CO_2$-based recovery of oil from unconventional formations during EOR. Once again, although most ionic surfactants are essentially $CO_2$-insoluble, there are many oil-soluble and water-soluble nonionic surfactants and other wettability-altering agents that are $CO_2$-soluble in the range of approximately 0.1-1.0% at formation conditions. As discussed above, $CO_2$-soluble and water-soluble nonionic surfactant solutions have been previously used to generate mobility control foams during EOR in conventional formations. In the systems hereof, however, the wettability-altering agent is used primarily to alter wettability of unconventional formations toward $CO_2$-philicity/wetness, water-wetness or oil-phobicity. Such an alteration in wettability may, in certain formations, provide significant benefits in addition to the numerous other mechanisms by which $CO_2$ recovers oil from shale (including, for example, solvent strength, oil swelling, oil viscosity reduction, diffusion, extraction, etc.).

In a number of representative studies, two nonionic, water-soluble, branched alkyl tail surfactants were studied (SURFONIC® N-100, an ethoxylated nonylphenyl alcohol with 10 ethylene oxide groups; and SURFONIC® TDA-9, an ethoxylated branched tridecyl alcohol with 9 ethylene oxide groups, available from Indorama Ventures Oxides LLC of The Woodlands, Tex. USA; see FIG. 2B). The solubility in $CO_2$ of those surfactants has been measured between 25-75° C. The surfactants exhibit a solubility of roughly 1 wt % at pressures of 2000-5000 psia, with lower pressures required for lower temperatures. SURFONIC TDA-9 (x=9 in FIG. 2B) is slightly more $CO_2$-soluble than SURFONIC N-100 (x=10 in FIG. 2B). Although oil-soluble, nonionic surfactants are also soluble in $CO_2$, they may be less likely to induce the desired change in wettability.

As described further below, shale samples were first aged via immersion in dead Eagle Ford crude oil at high temperature to attain oil-wet characteristics. The contact angle of water drops on the shale exposed to air was measured to verify oil-wetness. The shale was then immersed in either $CO_2$ or $CO_2$-surfactant solution for 16 h at 4000 psi and 80° C. Contact angles were then measured to determine if any shifts in wettability occurred. No significant changes in wettability occurred for samples immersed in $CO_2$. As described further below, however, a dramatic shift toward water-wet was detected for the sample immersed in the $CO_2$-surfactant solution. $CO_2$ huff 'n puff experiments on small cylindrical samples of oil-saturated shale immersed in pure $CO_2$ and $CO_2$-surfactant solutions were also conducted.

In that regard, the dissolution of wettability-altering nonionic surfactants in $CO_2$ during EOR in ULR may be used in a huff 'n puff process (that is, a cyclic process in which a well is injected with recovery enhancement fluid and, after a soak period, placed back on production) to increase the amount of incremental oil recovery and/or rate of incremental oil recovery associated with the huff 'n puff process. Without limitation to any mechanism, the primary objective for using $CO_2$-surfactant solutions during EOR in ULR is wettability alteration towards decreased oil-wetness, increased water-wetness and increased $CO_2$-wetness to promote spontaneous $CO_2$ imbibition and countercurrent oil production during the soak portion of the huff 'n puff process. This mechanism is distinct from proposed processes in which neat $CO_2$ huff 'n puff is followed by the imbibition of an aqueous surfactant solution to promote oil recovery in ULR.

Figure 4A:
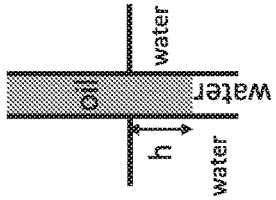
FIG. 4A illustrates schematically the alteration of wettability of a shale formation using a surfactant solubilized in water.

A number of studies have addressed how the surfaces of tight formations and shales become oil-wet, and how that wettability can be altered to oil-phobic via the use of aqueous surfactant solutions. Although the $CO_2$-surfactant solutions hereof are very different from such water-surfactant solutions and the concentration of surfactant is much lower, without limitation to any mechanism, it is hypothesized that similar modes may occur in the in the systems and method hereof. Once again, however, in the systems and methods hereof the surfactant is delivered in a $CO_2$-rich phase rather than in water and the surfactant concentration is much lower. Three mechanisms that have been identified for wettability alteration (from oil-wet to more water-wet) for ionic or nonionic surfactants in aqueous solutions include ion pair formation, surfactant adsorption and micellar solubilization. The primary mechanisms associated with nonionic surfactants in aqueous solutions are surfactant adsorption of hydrocarbon tails and oligomers of ethylene oxide (PEG, $EO_n$) and micellar solubilization. The concept of desirable wettability alteration is illustrated in FIG. 4A and by the contact angle studies of FIG. 4C for a water-oil-shale system.

Figure 4B:
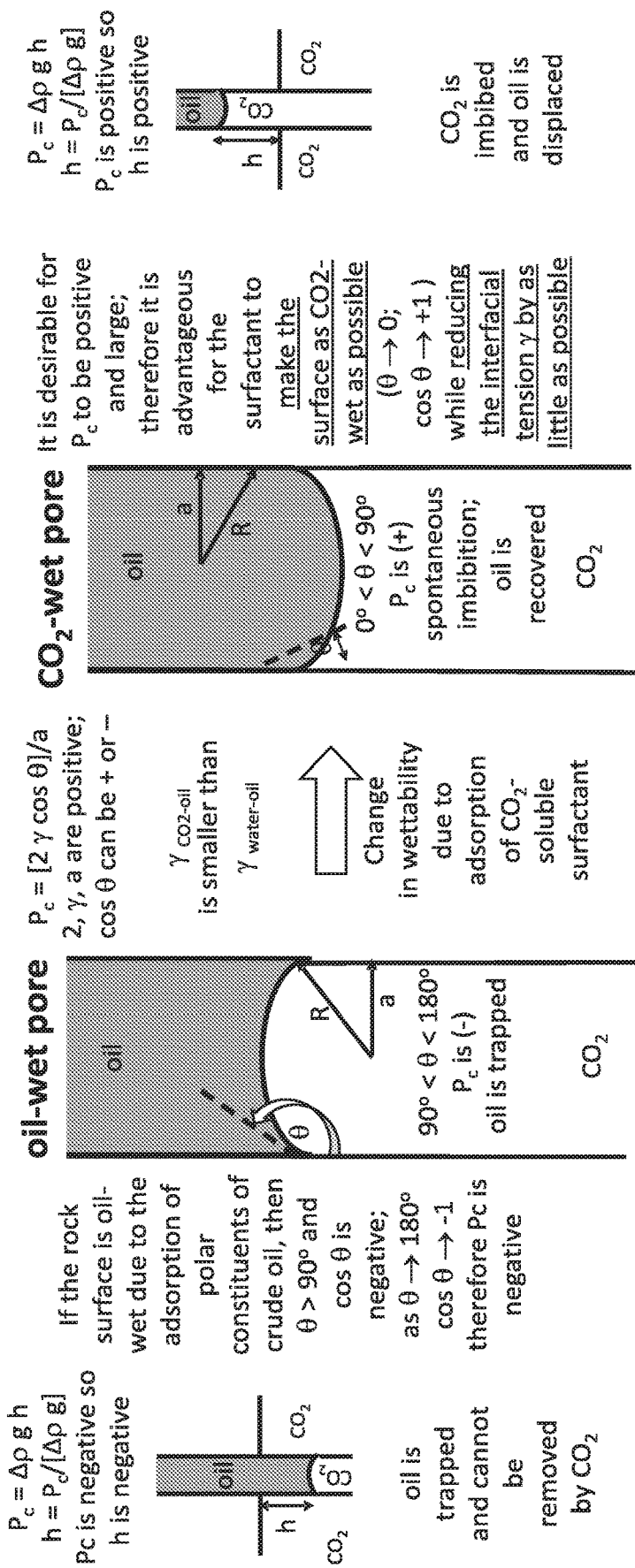
FIG. 4B illustrates schematically the alteration of wettability of a shale formation using a surfactant solubilized in $CO_2$.
Figure 4C:
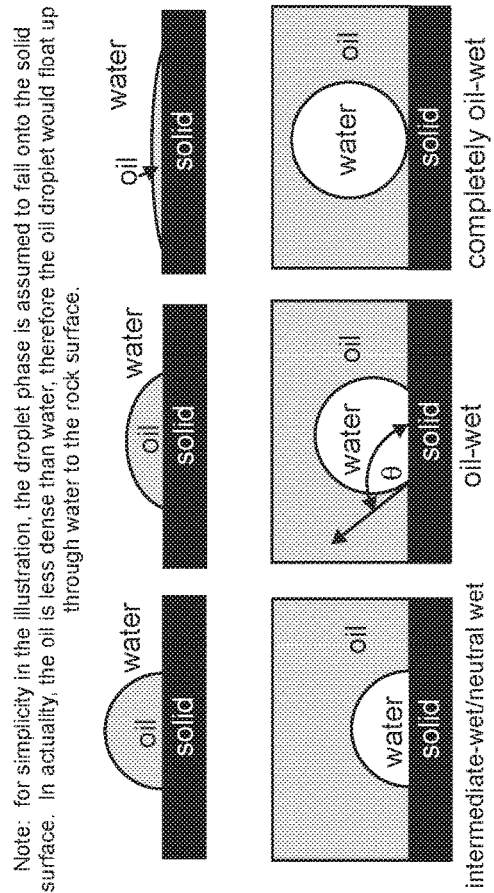
FIG. 4C illustrates the use of contact angle to illustrates wettability for an oil-water-shale system.
Figure 4C:
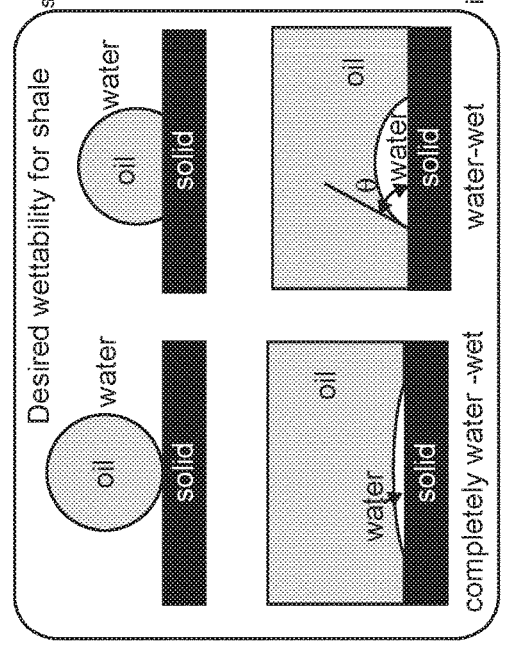
Figure 4D:
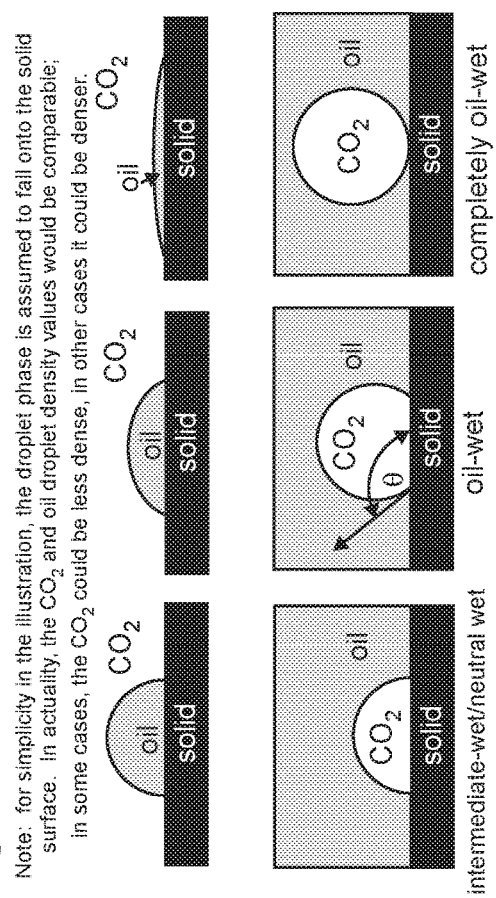
FIG. 4D illustrates the use of contact angle to illustrates wettability for an oil-$CO_2$-shale system.
Figure 4D:
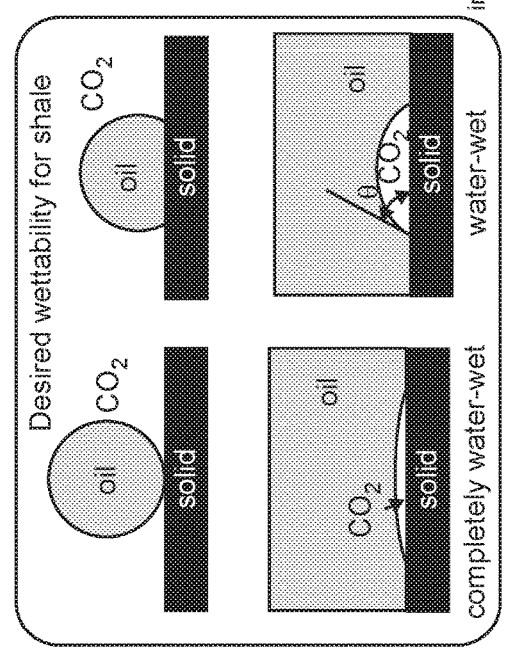
Figure 5:
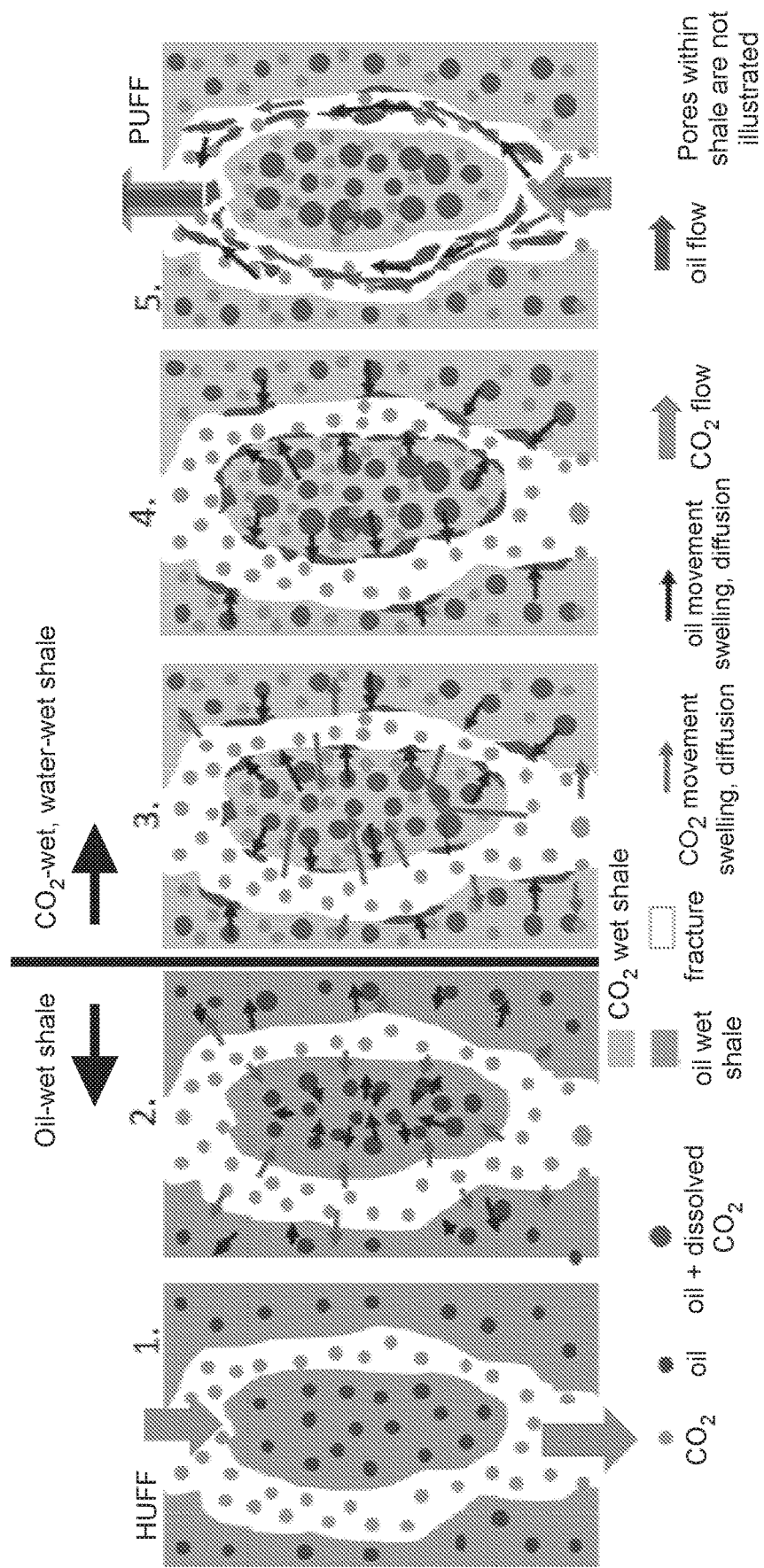
FIG. 5 illustrates schematically a number of mechanisms of oil recovery during a $CO_2$ huff 'n puff test process.

FIGS. 4B and 4D illustrates the analogous desirable wettability alteration for the proposed injection of $CO_2$-nonionic surfactant solutions. Once again, the addition of a surfactant to the injected $CO_2$ provides a potential means of imparting an additional mode of oil recovery—surfactant-induced wettability alteration—for $CO_2$ during EOR in ULR. Numerous mechanisms attributable to $CO_2$ during EOR in ULRs have already been identified, including $CO_2$ diffusion into oil, extraction of lighter components into $CO_2$, oil swelling, oil viscosity reduction, oil-$CO_2$ interfacial tension (IFT) reduction, and solution gas drive. The roles of multiple mechanisms are represented schematically in FIG.

5, which qualitatively illustrates the several mechanisms at work during a $CO_2$ huff 'n puff process when no surfactant is present and an additional proposed mechanism (via the change in matrix shading) of $CO_2$-soluble-induced wettability alteration during the soak cycle. The processes include:

1. HUFF—$CO_2$ flows away from the well and into previously established high permeability hydraulic fractures as a result of a large pressure drop. There is no significant flow of $CO_2$ into the shale matrix.
2. The high-pressure $CO_2$ begins to permeate into the rock matrix at fracture surfaces, which can cause some undesirable transport of oil deeper in the matrix (that is, farther from the fracture). However, the dissolution of $CO_2$ into the oil will cause it to swell, thereby causing the desirable extrusion of oil through the pores toward the fracture.
3. As $CO_2$ continues to permeate the rock, the oil will increasingly migrate to the rock surface based on swelling and lowered viscosity caused by the $CO_2$ in the oil.
4. Oil migrates to the bulk $CO_2$ in the fractures via swelling and reduced viscosity, and as the $CO_2$ pressure gradient gets smaller, oil production is driven by oil concentration gradient diffusion from pores within the shale matrix.
5. PUFF—$CO_2$ and oil flow back out of fractures because of the large pressure drop that occurs during the flowback period into the fractures toward the well.

To ensure that the amount of additional oil recovery and/or the increased rate of oil recovery (if any) justifies the added expense of the surfactant it may be desirable that a significant change in wettability be achieved. During the huff 'n puff EOR with $CO_2$ only, low interfacial tensions can be established between an oil-rich phase and $CO_2$-rich phase. Therefore, IFT reduction is a commonly cited and frequently studied aspect of $CO_2$ EOR. As IFT is reduced, capillary pressure ($P_c$) becomes smaller and less significant, whether or not favorable wettability is attained with pure $CO_2$. Therefore, any favorable change in wettability attained with a $CO_2$-soluble surfactant may not be significant if the $CO_2$-oil IFT is already vanishingly small. Further, surfactants can not only alter wettability, but also reduce interfacial tension. Spontaneous imbibition during the soak cycle is enhanced by attaining a capillary pressure $P_c$ that is both positive and large. Therefore, even if the wettability is favorably altered, making $P_c$ positive, reduction of IFT to ultralow levels can diminish the spontaneous imbibition of water that recovers oil because it would render $P_c$ positive but small. Therefore, a significantly favorable change in wettability coupled with little reduction in IFT is typically desired during the soak cycle. The choice of $CO_2$-soluble surfactants for use herein and the injection conditions such as pressure may, for example, be optimized to achieve such goals through the knowledge of those skilled in the art and routine experimentation as described herein.

Once again, any of the water-soluble nonionic surfactants that have been considered for $CO_2$ EOR in conventional formations are also candidates for $CO_2$ EOR in unconventional formations, even though the surfactants were added for different reasons (foam stabilization in conventional formations, wettability alteration in unconventional formations). Because the objective in the systems and methods hereof is not associated with the generation of $CO_2$-in-water foams in situ, it is not necessary to restrict the nonionic surfactant selection to water-soluble candidates. Therefore, oil-soluble nonionic surfactants with short $EO_n$ segments, water-soluble nonionic surfactants with long $EO_n$ segments, and water-dispersible surfactants with an intermediate length $EO_n$ segment could also be candidates. The oil-soluble surfactants with shorter $EO_n$ segments would be more $CO_2$-soluble, and would be able to partition into the oil layer on the rock and adsorb to the mineral, but would be less likely to impart increased oil-phobicity, more water-wetness or more $CO_2$-wetness to the pore surface. However, if the EO segment is too long, the nonionic surfactant will become $CO_2$-insoluble even though it remains water-soluble.

Further, one may consider the use of highly propoxylated nonionic surfactants ($C_m PO_n$) rather than the common ethoxylated nonionic surfactants ($C_m EO_n$) or water-soluble nonionic surfactants with a few PO groups that act as a "linker" to the longer EO chain ($C_m PO_x EO_n$, where n>x). Although the $PO_n$ group is less water-soluble than $EO_n$ (which is why ethoxylated nonionic surfactants are so prevalent in aqueous solutions), polypropylene oxide ($PO_n$) is more $CO_2$-soluble and $CO_2$-philic than $EO_n$ and may be a better selection for enhancing the $CO_2$-philicity or $CO_2$-wetness of the surface. However, the $PO_n$ group is also more oil-philic than the $EO_n$ group, therefore propoxylated nonionic surfactants may, in certain formations, be less effective than ethoxylated nonionic surfactant in favorably altering wettability.

Figure 6A:
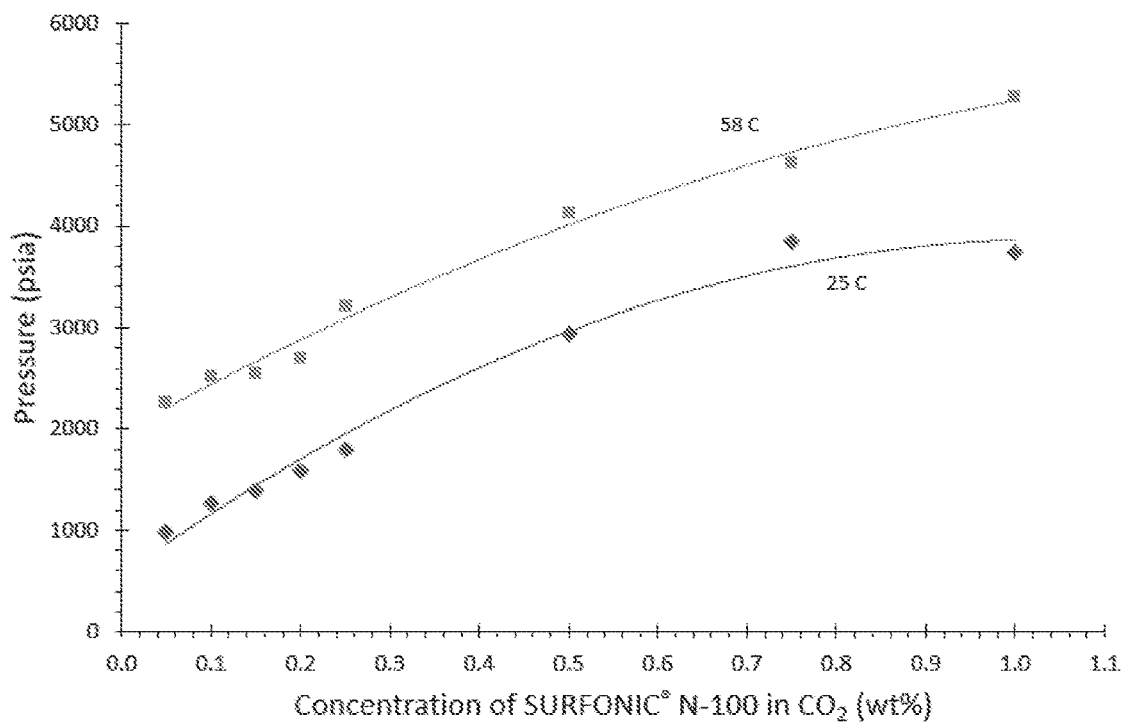
FIG. 6A illustrates pressure-composition (Px) diagrams form SURFONIC® N-1000 surfactant in $CO_2$ at 25° C. and 58° C.
Figure 6B:
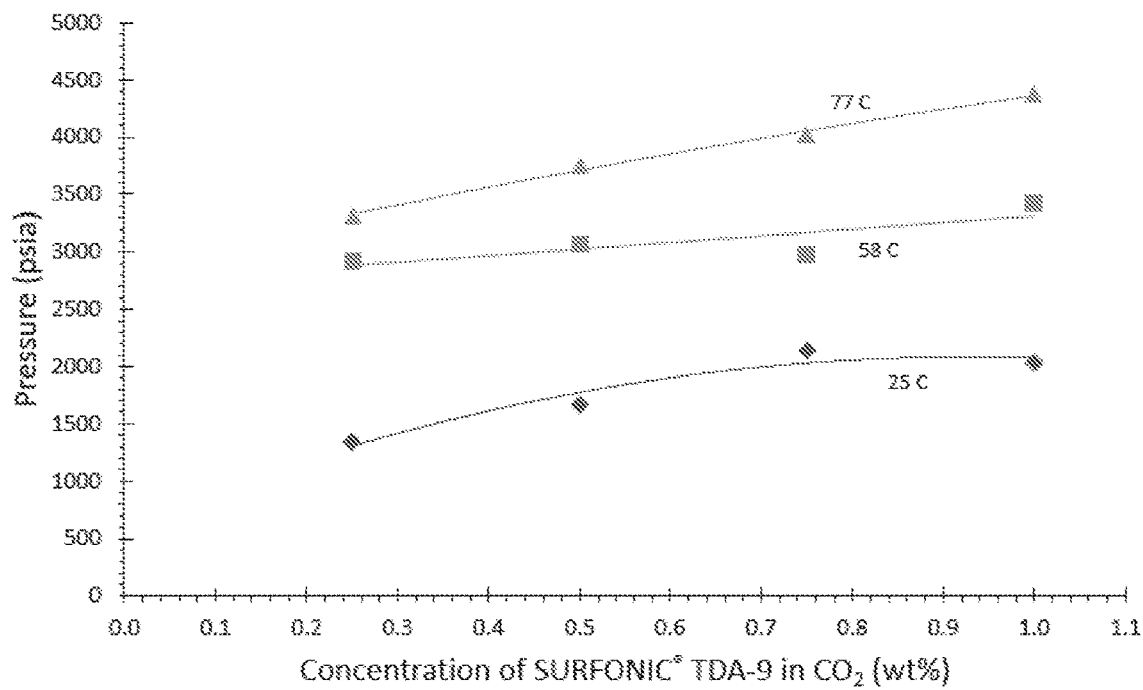
FIG. 6B illustrates pressure-composition (Px) diagrams form SURFONIC® TDA-9 surfactant in $CO_2$ at 25° C., 58° C. and 77° C.

Both SURFONIC® N-100 and SURFONIC® TDA-9 are soluble in liquid and supercritical $CO_2$, as shown in FIGS. 6A and 6B which set forth isothermal cloud point loci. A single-phase region occurs above each locus, a surfactant-rich phase begins to come out of solution at the pressure corresponding to the curve, and at lower pressure the mixture resides in the two-phase region. As noted in all prior studies of $CO_2$-nonionic surfactant phase behavior, the cloud point pressure increases with increasing temperature for a given composition, and the cloud point pressure increases with concentration in the dilute concentration range up to 1 wt % surfactant in $CO_2$. The surfactant samples of FIGS. 6A and 6B appear to be slightly more $CO_2$-soluble than previously reported data for the same surfactants. During wettability alteration tests and $CO_2$ huff 'n puff, one should operate at conditions above the cloud point pressure for a given mixture of surfactant and $CO_2$ to ensure that the surfactant is completely dissolved in $CO_2$.

Figure 7:
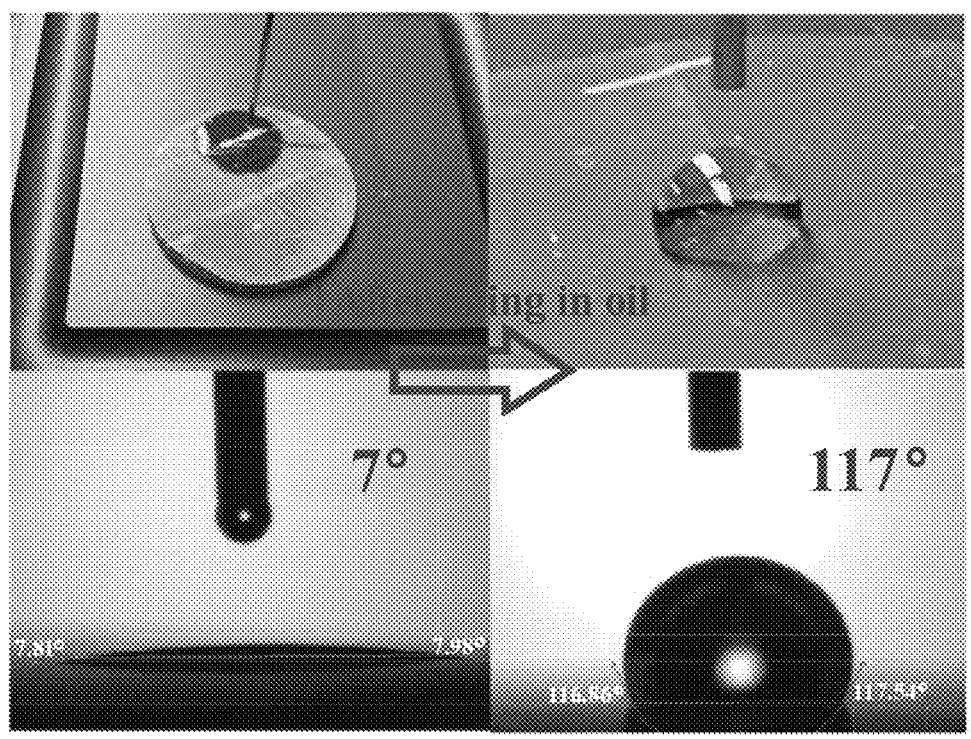
FIG. 7 illustrates contact angle measurements of water droplets in air demonstrating the oil-wet characteristic attained after aging the shale samples in oil.

Contact angle measurements were performed using sessile water droplets on Eagle Ford sample at ambient conditions. The original wettability of the sample was determined to be strongly water-wet as shown in FIG. 7. Water solubilized samples were first tested because the wetting agents/surfactants are water soluble and the experiments are readily and easily performed. The water droplet immediately spread out once it touched the surface of the rock, leading to a contact angle of about 8°. After aging the sample in oil, the new water droplet made a contact angle of 117° with the surface, showing the change in the wettability of shale sample toward intermediate-wet (FIG. 7).

Figure 8A:
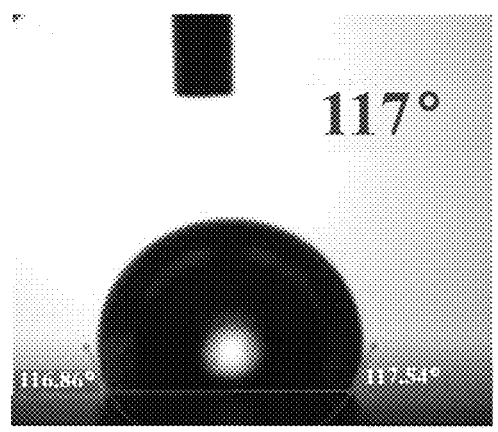
FIG. 8A illustrates contact angle measurements of water droplets in air demonstrating the impact of soaking the oil-wet rock samples in SURFONIC® N-100 surfactant concentration in water on wettability alteration of shale sample for surfactant concentrations of 0 wt %, 0.01 wt %, 0.1 wt %, and 1 wt %.
Figure 8A:
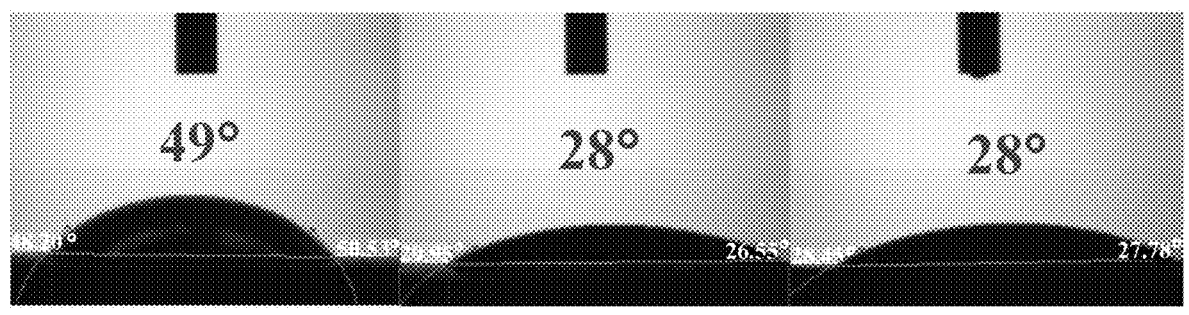
Figure 8B:
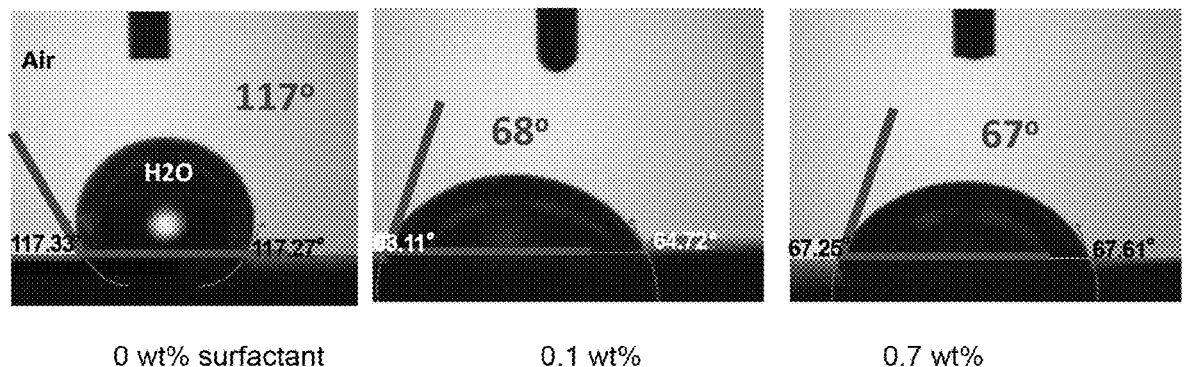
FIG. 8B illustrates contact angle measurements of water droplets in air demonstrating the impact of soaking the oil-wet rock samples in SURFONIC® TDA-9 surfactant concentration in water on wettability alteration of shale sample for surfactant concentrations of 0 wt %, 0.1 wt % and 0.7 wt % surfactant.

SURFONIC® N-100 was selected as the first surfactant to be solubilized in $CO_2$. The required concentration for wettability alteration was estimated by comparing the water droplet contact angles in air on the shale samples after being treated with 0.01 wt %, 0.1 wt %, and 1 wt % SURFONIC® N-100 surfactant solution in water as shown in FIG. 8. No further decrease in contact angle was observed when the concentration was increased above 0.1 wt %. Therefore, 0.1 wt % concentration was selected as an appropriate concentration of surfactant to add to $CO_2$. Because $CO_2$ is a weaker solvent for SURFONIC® N-100 than water, it is expected that the levels of adsorption and wettability alteration should be greater when the shale is placed in the $CO_2$-surfactant solution at 0.1 wt %.

Figure 9:
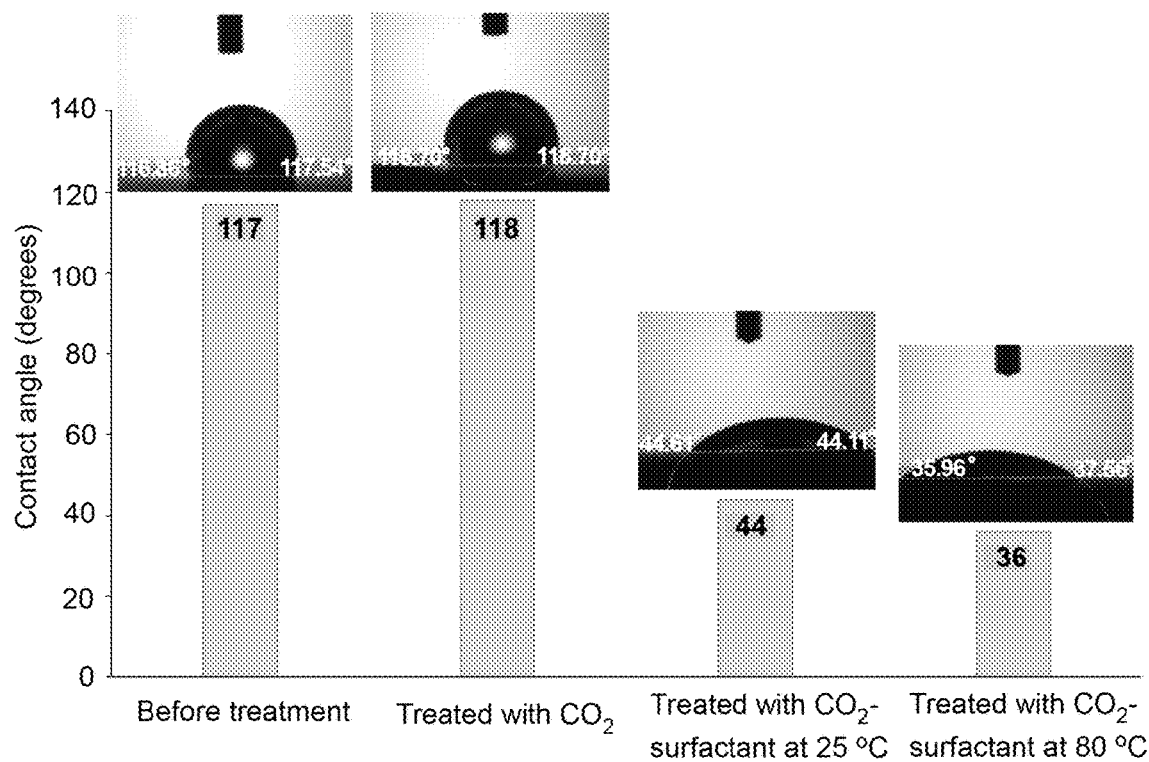
FIG. 9 illustrates contact angle measurements of water droplets in air demonstrating the impact of soaking the oil-wet rock samples in $CO_2$ and in a $CO_2$-surfactant solution (SURFONIC® N-100) treatment on wettability alteration of shale sample.

Subsequently, the shale samples were treated with pure $CO_2$ and then with $CO_2$-surfactant solution at 80° C. and 4000 psi for 16 h. The extent of wettability alteration is described in the studies of FIG. 9, in which droplets of water were placed on the shale samples in air. Compared to the starting intermediate-wet condition, treating the sample with pure $CO_2$ showed no effect on the wettability by generating a contact angle of 118°. On the other hand, after the sample was exposed to $CO_2$-surfactant solution (0.1 wt %), the contact angles were reduced to 44° and 36° at temperatures of 25° C. and 80° C., respectively. These results demonstrate that a dilute concentration of surfactant was able to enhance the ability of $CO_2$ to shift the wettability of the shale sample toward water-wet and how this effect was improved with temperature.

Figure 10:
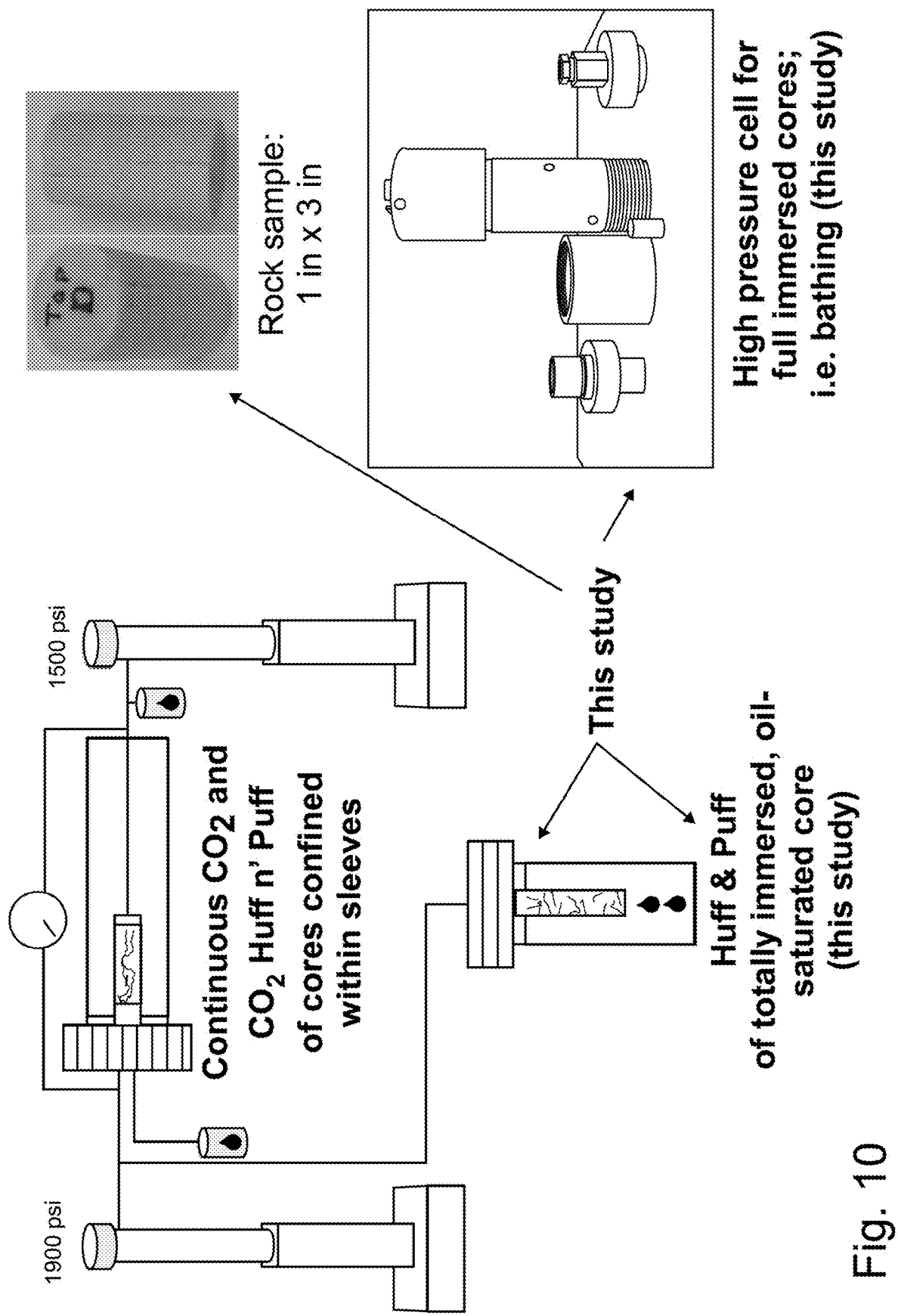
FIG. 10 illustrates a system used for huff 'n puff experimental studies hereof.

Huff 'n puff experiments were conducted using Eagle Ford outcrop cores, which were previously saturated with Eagle Ford dead crude oil. The system for the huff 'n puff experiments is illustrated in FIG. 10. The core properties are listed in Table 1 below (wherein Surf A is 0.1 wt % Indoroma SURFONIC N-100 and Surf B is 1.9 wt % Indorama SURFONIC TDA-9). The Eagle Ford cores were immersed in dead Eagle Ford crude oil at 50° C. and 4000 psi for 14 days. No change in oil content was achieved with longer durations. No brine was used in the experiments.

TABLE 1

| Experiment | Core | Length (cm) | Diameter (cm) | Permeability (μD) | Porosity (%) | Dry Weight (g) | Wet Weight (g) |
|---|---|---|---|---|---|---|---|
| $CO_2$-Surf A | Eagle Ford | 5.03 | 2.55 | 11.58 | 7.22 | 56.00 | 58.24 |
| $CO_2$ | Eagle Ford | 5.08 | 2.55 | 9.46 | 7.55 | 56.44 | 58.78 |
| $CO_2$-Surf B | Eagle Ford | 5.05 | 2.55 | — | 7.53 | 57.60 | 59.71 |

Figure 11:
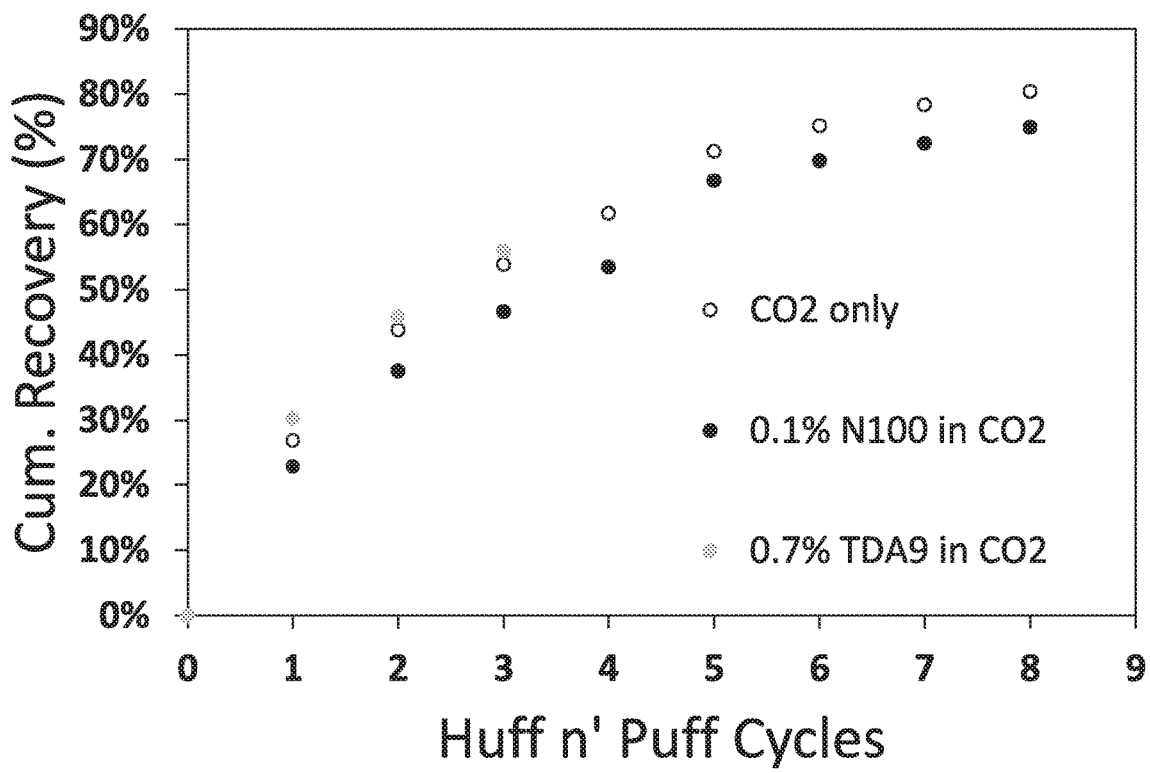
FIG. 11 illustrates oil recovery from a shale core sample as cumulative recovery (%) using pure $CO_2$, a $CO_2$-surfactant solution made with SURFONIC® N-100 at 0.1 wt % and a $CO_2$-surfactant solution made with SURFONIC® TDA-9 at 0.7 wt %.
Figure 12:
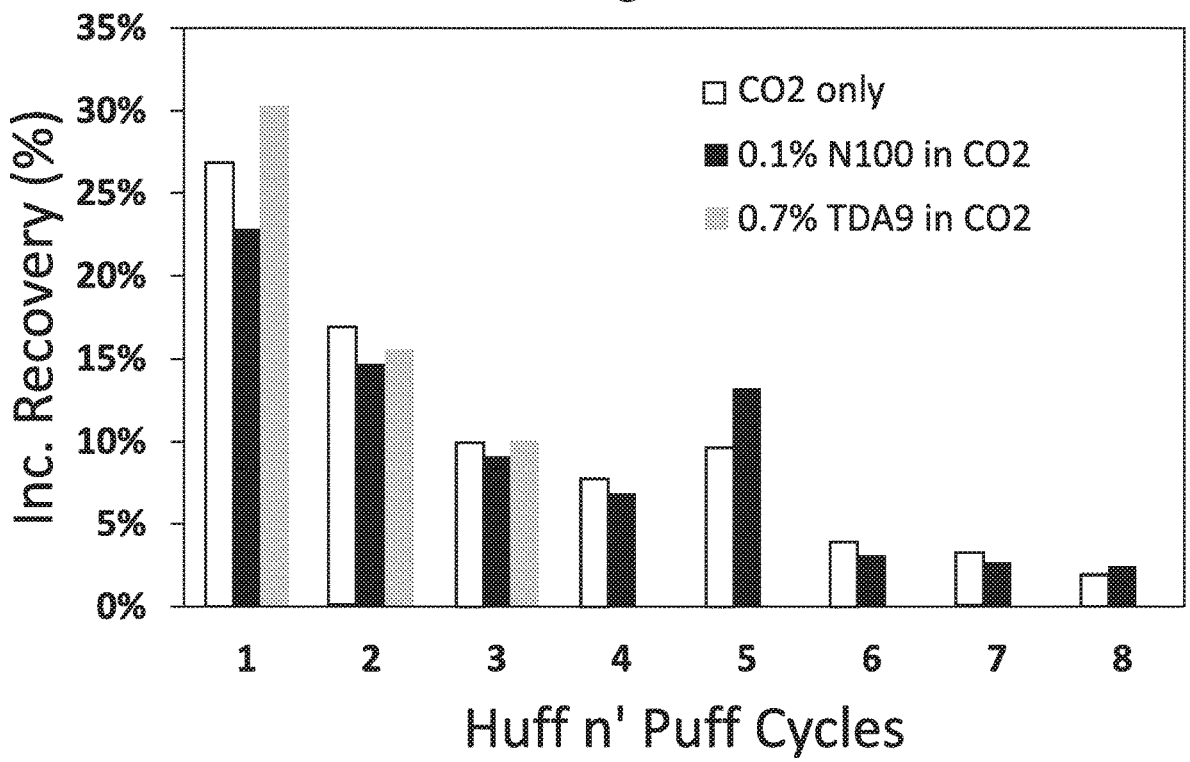
FIG. 12 illustrates oil recovery from a shale core sample as incremental recovery (%) using pure $CO_2$, a $CO_2$-surfactant solution made with SURFONIC® N-100 at 0.1 wt % and a $CO_2$-surfactant solution made with SURFONIC® TDA-9 at 0.7 wt %.

The $CO_2$ and $CO_2$-surfactant solutions (made with SURFONIC® N-100 at 0.1 wt % and SURFONIC® TDA-9 at 0.7%) huff 'n puff studies were conducted at 4000 psi and 80° C. The huff 'n puff oil recovery tests included 24-hour cycles including a 16-hour soak and an approximately 30-minute puff. The recovery was calculated by dividing the change in the core weight after each cycle by the total oil-in-place, which is the weight difference between saturated core and dry core. FIG. 11 sets forth the ultimate oil recovery results and FIG. 12 sets forth the incremental oil recovery after each huff 'n puff cycle. In the studied cores, the highest recovery was obtained with 0.7 wt % SURFONIC® TDA-9. The largest difference occurred in the first cycles. The recovery with $CO_2$ was slightly lower than that for the 0.7 wt % SURFONIC® TDA-9 solution. Even lower recovery was achieved with the 0.1 wt % SURFONIC® N-100 solution.

In a number of other embodiments of systems and methods hereof, relatively dilute concentrations of ketones (which are lower in molecular weight than typical surfactants) may be used to increase water wettability of subterranean formations. Unlike surfactants, ketones (such as acetone, a butanone, or a pentanone) of the systems, methods and/or compositions hereof may be effective to reduce hydrocarbon/oil wettability and/or increase water wettability of at least a portion of a subterranean formation without significant risk of reducing interfacial tension. Such result is desirable in certain embodiments because oil recovery is enhanced by increasing water wettability without lowering interfacial tension (which generates a favorably large capillary pressure to expel oil).

In the case of use of one or more ketones in methods, systems of compositions hereof, the ketone(s) may, for example, have 20 carbons or less. In a number of embodiments, the ketone(s) have 11 carbons or less. The ketone(s) may be symmetrical, asymmetrical, linear, branched or cyclic. Ketones with one or two carbonyl groups (C=O) may be used. Ketones with a carbonyl group or groups positioned at any location along the molecule are suitable for user herein (for example, a pentanone can be 2-pentanone or 3-pentanone). Ketones for use herein may also be substituted as long as the compound will dissolve in sufficient concentration in $CO_2$ in the pressure range of injection into the formation to be an effective wettability altering agent.

In the above studies, the impact of dilute concentration of an agent such as a nonionic surfactant on $CO_2$-EOR was investigated by focusing on wettability alteration mechanism. Pressure-composition (Px) diagrams for SURFONIC® N-100 in $CO_2$ and SURFONIC® TDA-9 in $CO_2$ were obtained at 25° C. and 58° C. (and 77° C. for SURFONIC® TDA-9). These studies provide a guideline for determining the level of wetting agent/surfactant solubility in $CO_2$. Initial operating conditions of 4000 psi and 80° C. were selected as representative of the lowest temperature range associated with unconventional formations targeted for $CO_2$ EOR. No change in wettability was observed when the oil-wet rock sample was exposed to pure $CO_2$. However, the studied wetting agents/surfactants significantly enhanced the ability of $CO_2$ to change the wettability of Eagle Ford sample from intermediate-wet to water-wet, as evidenced by a reduction in the water-shale-air contact angle.

The impact on the oil recovery was also studied by conducting huff 'n puff experiments on representative shale cores. Such experiments provide a ready guide for optimizing choice of a wetting agent (for example, a surfactant or ketone) for use in connection with enhance oil recovery for a particular subterranean formation. There are significant differences between different subterranean formations. Using literature information, knowledge of those skilled in the art and routine experimentation as described herein, one may determine a suitable or optimized wetting agent, such as a surfactant or ketone, for use in a particular subterranean formation. Without limitation to any mechanism, in the studies of SURFONIC® N-100 in $CO_2$ and SURFONIC® TDA-9 in $CO_2$, is it possible that the larger, aryl containing SURFONIC® N-100 had limited access to the pores of the low-porosity Eagle Ford shale. Moreover, in the case of each surfactant, it is possible that the recovery will be improved by lowering pressure (to a pressure than 4000 psi, but to pressure about the cloud point) to provide alteration of wettability while limiting the effect on interfacial tension. Once again, conditions such as the choice of the wettability altering agent, concentration of the wettability altering agent, and/or injecting/soaking pressure are readily optimized to economically achieve enhanced oil recovery. Minimum miscibility pressure (MMP) may provide a rough estimate for a desire range of pressure. However, MMP is of more limited use in unconventional formations that in conventional formations.

In the case of use of the $CO_2$-wettability-altering-agent solutions hereof in the field (that is, in actual oil recovery from a subterranean formation, the $CO_2$-wettability-altering-agent solution is injected into the well (huff) and the allowed to soak in the formation for an extended period of time before the puff stage in which pressure is decreased and production occurs. As used herein, the term "extended period of time", when used in connection with a soak phase, is greater than two days, greater than one week, greater than two weeks or greater than one month. In a number of embodiments, such an extended period of time is on the order of, for example, three day days to 5 months, one week to five months or two weeks to two months. Typically, during the extended period of the soak stage, no injection into or production from the subterranean formation occurs. Injection into the subterranean formation and production from the subterranean formation typically occurs from the same well in the case of formation in which the $CO_2$-wettability-altering-agent solutions hereof may find the best utility (for example, in an unconventional formation).

$CO_2$-wettability altering agents hereof may, for example, be injected using injection systems commonly used to inject $CO_2$ into, for example, subterranean formations. Although the methods hereof have been discussed primarily in connection with subterranean formations, such methods may, for example, be used in connection with other substrates (for example, porous or permeable substrates) to at least one of decrease oil-wettability or increase water wettability or $CO_2$-philicity/wettability.

Experimental

Materials. Eagle Ford outcrop rock samples were purchased from Kocurek Industries Inc. Eagle Ford dead crude oil from a formation in the 255-280° F. (124-138° C.) temperature range was received from a producer. $CO_2$ (99.9%) was obtained from Butler Gas. However, according to the measurements performed by Zhang et al (2018), the operational conditions of this work (4000 psi and 80° C.) is well above MMP, meaning that the miscibility of $CO_2$ and the Eagle Ford oil is certainly developed during the experiments. Two water-soluble, nonionic ethoxylated alcohols were selected for this study. Both were received from Huntsman immediately prior to the phase behavior experiments. The surfactants studied in a number of studies, as illustrated in FIGS. 6A and 6B, were SURFONIC® N-100, a branched nonylphenol ethoxylate with an average of 10 EO groups (left, average x=10) and SURFONIC® TDA-9, an ethoxylated branched tridecyl alcohol with an average of 9 EO groups (right, average x=9). A mixture of isomers is present in the alkyl tails of both surfactants; a representative structure is shown for each.

Solubility of surfactants in $CO_2$. The solubility of the nonionic surfactant in $CO_2$ was determined using a visual, non-sampling technique as known in the art. Known amounts of the thickener and liquid $CO_2$ were charged to a high pressure, fully windowed, agitated, invertible, variable-volume (10-100 ml) view cell (Schlumberger) rated to 69 MPa (10000 psi) at 180° C. The cell is housed within a refrigerated/heated air bath (−20° C. to 180° C.). The contents were then compressed to pressures as high as 69 MPa and mixed with a magnetically driven slotted fin impeller spinning at ~2000 rpm. The mixer was then stopped, and the entire cylindrical volume of the cell was inspected to verify that a single, transparent fluid phase was attained. If so, the single-phase was expanded at a very slow rate until a second phase first appeared, typically in the form of a cloud point (of surfactant-rich droplets or particles). Typically, this procedure was repeated five times and the average value of the cloud points is determined. By changing composition via additions of $CO_2$, a phase boundary curve (that is, cloud point locus) can be constructed.

Contact angle measurements. Small rock samples (about 0.2 in. thickness) were cut from outcrop Eagle Ford cores and cleaned for 5 min using a Harrick Plasma Cleaner (Model PDC-32G) at medium radio frequency (RF) level with air as a carrier gas. Contact angle measurements were performed at ambient conditions using Attension Theta optical tensiometer through sessile drop method. A rock sample was positioned on the sample holder between the light source and camera. A drop of deionized water was placed on the shale sample using a micro syringe and the angle at the water-air-rock contact point was measured within the water zone. Contact angles were recorded once the water droplet become stable. The reported angles were the average of at least three measurements. Initially, the original wettability of the rock was determined by measuring the contact angle of a water droplet in air. Then, to attain oil-wet characteristics, the rock samples were aged via immersion in dead Eagle Ford crude oil at high temperature (80° C.) and atmospheric pressure for four days, which was determined to be the proper aging time for this system. Surfactant solutions with various concentrations were made in deionized water.

To treat the oil-wet Eagle Ford samples with surfactants, they were placed in 10 cc of surfactant solutions at room temperature. The solution was agitated using magnetic mixer for 45 min. Then, the samples were taken out and placed on Kim wipes to dry before performing contact angle measurements. To treat the oil-wet Eagle Ford samples with $CO_2$, the samples were placed in a high-pressure cell and exposed to $CO_2$ at 4000 psi and 80° C. for 16 hr. To treat the oil-wet Eagle Ford samples with $CO_2$-surfactant solutions, certain amount of surfactant and a magnetic stirrer were placed in the high-pressure cell. Samples were positioned in the cell in such a way that it would not be in direct contact with the surfactant. The cell was sealed and equilibrated at 80° C. Then, $CO_2$ was added very slowly to reach 4000 psi. Once the system was stabilized, the magnetic stirrer was turned on. After treating the sample for 16 h, fresh $CO_2$ was added to displace the $CO_2$-surfactant solution. Finally, the cell was slowly depressurized and cooled down, before taking out the samples to perform contact angle measurements.

$CO_2$ huff 'n puff experiments. Outcrop Eagle Ford core plugs (2" length×1" diameter) were cut and tested to measure porosity and absolute permeability using nitrogen. After weighing the cores (dry weight), they were vacuumed for 48 h in a high-pressure vessel. Then, the vacuum pump was isolated and Eagle Ford crude oil was slowly added to the vessel. The cores were immersed in the crude oil for aging at 50° C. and 4000 psi. The aging time of 8 days was determined (by weighing) to be long enough to saturate the cores with crude oil. Once saturated, the cores were taken out, gently wiped to remove any surface oil, and weighed to determine the initial oil-in-place (wet weight).

To perform huff 'n puff experiments, the core was placed in a high-pressure cell (2.25" length×1.25" inside diameter). The internal section of the cell (1.25" length×0.8" inside diameter) allowed the core to be positioned in such a way that it would not be in direct contact with the surfactant and stirrer. The purpose of this design was to minimize the volume around the core, which will be filled with $CO_2$ allowing the core to be fully immersed in the $CO_2$-surfactant solution during the soaking process. Minimizing the volume around the core will help to diminish the effect of temperature variations (freezing) while depressurizing $CO_2$ during the puff period. Before placing the core in the cell, surfactant was added to the smaller section of the cell along with the stirrer. The core holder containing the oil-saturated core was placed inside the oven (80° C.) and allowed to be equilibrated. $CO_2$ was very slowly added at the temperature to reach the desired pressure (4000 psi). The magnetic stirrer was turned on once the system was at the set temperature and pressure conditions. Then, the soaking period was started at constant pressure for 16 h. At the end of each cycle, the core holder was gradually depressurized, and $CO_2$ was slowly displaced, to represent the huff process. Finally, the core was removed, the oil appeared on the core surface was wiped, and the core weight was recorded to determine the amount of recovery. The core was kept at room temperature for three to four hours until the weight of the core stabilized. Then, the cell was assembled again for the next cycle. This procedure, which constitutes one huff 'n puff cycle, was repeated until no more oil was produced and ultimate recovery was achieved. Huff 'n puff experiments were conducted either with $CO_2$ alone, or with the appropriate amount of surfactant also added to the core holder to form the $CO_2$-surfactant solution. The first tests of this concept were conducted at the low temperature end of unconventional liquid reservoirs (80° C.); subsequent testing will be conducted at higher temperature.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of recovering hydrocarbons from a subterranean formation which is an unconventional formation, a low-permeability formation or a moderate-permeability formation, comprising:
    injecting into the subterranean formation a composition comprising carbon dioxide and at least one carbon-dioxide-soluble compound,
    allowing the composition to soak in the subterranean formation under conditions comprising a pressure in the range of 1,000 (6.89 Megapascal) to 10,000 psi (68.9 Megapascal), for an extended period of time in the range of 2 days to 5 months after injection of the composition, and without production from the subterranean formation, so that oil-wettability is decreased or carbon-dioxide-wettability is increased in at least a portion of the subterranean formation, and
    subsequent to soaking for the extended period of time, initiating production.

2. The method of claim 1 wherein the extended period of time is in the range of two weeks to two month after injection thereof without production from the subterranean formation.

3. The method of claim 2 wherein the at least one carbon-dioxide-soluble compound comprises an oil-philic segment.

4. The method of claim 3 wherein the at least one carbon-dioxide-soluble compound is a nonionic surfactant or an amphiphilic polymer.

5. The method of claim 3 wherein the oil-philic segment comprises an alkyl group or an aromatic group.

6. The method of claim 1 wherein the conditions comprise a pressure in the range of 1000 psi (6.89 Megapascal) to 5,000 psi (34.47 Megapascal).

7. The method of claim 1 wherein the at least one carbon-dioxide-soluble compound comprises an oil-philic segment and at least one carbon-dioxide-philic segment.

8. The method of claim 7 wherein the oil-philic segment is carbon-dioxide-philic.

9. The method of claim 7 wherein the at least one oil-philic segment comprises a linear or branched alkyl group, an aromatic group, a cyclic group, an alkyl group attached to an aromatic or cyclic group, an oligomer of propylene glycol, or an oligomer of propylene glycol attached to an alkyl group.

10. The method of claim 9 wherein the at least one carbon-dioxide-philic segment is a polymer of an alkylene oxide.

11. The method of claim 10 wherein the alkylene oxide is an oligomer of at least one of ethylene oxide and propylene oxide.

12. The method of claim 1 wherein the at least one carbon-dioxide-soluble compound is water soluble or is oil soluble.

13. The method of claim 1 wherein the subterranean formation is shale.

14. A method of altering a subterranean formation, comprising:
    injecting into the subterranean formation a composition comprising carbon dioxide and at least one carbon-dioxide-soluble compound, and
    allowing the composition to soak in the subterranean formation under conditions comprising a pressure in the range of 1,000 to 10,000 psi, and for an extended period of time in the range of 2 days to 5 months after injection thereof, so that oil-wettability is decreased or carbon-dioxide-philicity is increased in at least a portion of the subterranean formation.

15. The method of claim 14 wherein the extended period of time is in the range of two weeks to two month after injection thereof without production from the subterranean formation.

* * * * *